(12) United States Patent
Shveidel et al.

(10) Patent No.: US 11,853,574 B1
(45) Date of Patent: Dec. 26, 2023

(54) CONTAINER FLUSH OWNERSHIP ASSIGNMENT

(71) Applicant: Dell Products L.P., Hopkinton, MA (US)

(72) Inventors: Vladimir Shveidel, Pardes-Hana (IL); Geng Han, Beijing (CN); Changyu Feng, Beijing (CN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/845,332

(22) Filed: Jun. 21, 2022

(51) Int. Cl.
*G06F 3/06* (2006.01)

(52) U.S. Cl.
CPC ............ *G06F 3/064* (2013.01); *G06F 3/0604* (2013.01); *G06F 3/067* (2013.01); *G06F 3/0631* (2013.01); *G06F 3/0659* (2013.01)

(58) Field of Classification Search
CPC ...... G06F 3/064; G06F 3/0604; G06F 3/0631; G06F 3/0659; G06F 3/067
USPC ................................................. 711/154, 159
See application file for complete search history.

(56) References Cited

U.S. PATENT DOCUMENTS

| 2005/0114607 A1* | 5/2005 | Cohen | G06F 12/145 |
| | | | 711/135 |
| 2019/0095460 A1* | 3/2019 | Wang | G06F 3/0647 |
| 2023/0027329 A1* | 1/2023 | Durham | H04L 9/0631 |
| 2023/0118155 A1* | 4/2023 | Shveidel | G06F 3/061 |
| | | | 711/154 |

OTHER PUBLICATIONS

U.S. Appl. No. 17/236,887, filed Apr. 21, 2021, entitled Container Ownership Protocol for Independent Node Flushing, to Vladimir Shveidel, et al.
U.S. Appl. No. 17/231,197, filed Apr. 15, 2021, entitled Smooth Flushing or Cached Write Data, to Vladimir Shveidel, et al.

* cited by examiner

*Primary Examiner* — Than Nguyen
(74) *Attorney, Agent, or Firm* — Muirhead and Saturnelli, LLC

(57) ABSTRACT

A protocol for processing write operations can include recording each write operation in a log using a PDESC (page descriptor)-PB (page block) pair. The log entry for the write operation can be included in a container of logged writes. In a dual node system, the protocol when processing the write operation, that writes first data, can include incrementing a corresponding one of two counters of the container, where the corresponding counter is associated with one of the system's nodes which received the write operation and and caches the first data. Each container can be associated with an logical block address (LBA) range of a logical device, where logged writes that write to target addresses in the particular LBA range are included in the container. Nodes can independently determine flush ownership using the container's counters and can flush containers based on the flush ownership.

20 Claims, 17 Drawing Sheets

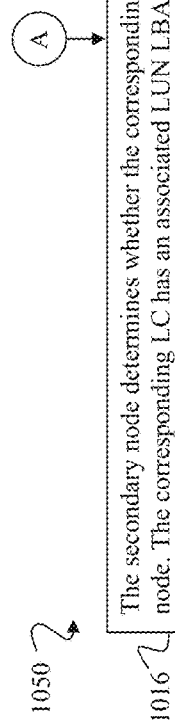

1050

Ⓐ

1016 — The secondary node determines whether the corresponding LC, for the target logical address, exists in the FWS of the secondary node. The corresponding LC has an associated LUN LBA range that includes the target logical address of the write I/O. If the LC does not exist in the FWS of the secondary node, the secondary node allocates and initializes the LC structure. The LC structure can include two counters, COUNT A and COUNT B, denoting the number of blocks or pages of logged write data of the LC ingested or received by, respectively, the nodes A and B.

1018 — The secondary node increments the appropriate one of the two counters (of the LC which is in its node local FWS and which corresponds to the target logical address) based on which one of the nodes, A or B, is the initiator with respect to the current write I/O operation being processed.

1020 — The secondary node adds an entry to the LC (which is in its node local FWS and which corresponds to the target logical address) for the PDESC representing the write I/O operation. The entry is added to the list of logged writes of the LC. The LC can include a linked list which represents a time-ordered list of logged write I/O operations. Each of the logged write I/O operations on the list can be represented by a corresponding PDESC. The list of the LC can be a linked list of pointers to the secondary node's memory local copy of PDESCs describing the write I/O operations to logical addresses included in the LUN LBA range associated with the LC.

1022 — The secondary node sends a reply, acknowledgement or response to the primary node for the previously received commit message. The reply can denote that the secondary node has completed its portion of the data commit processing to persistently commit the write I/O to the log.

1024 — The primary node receives the reply from the secondary node and, in response, performs additional processing including adding an entry for the PDESC for the write I/O operation (where the PDESC is persistently stored in the log 406) to the list of logged writes of the LC (which is in the primary node's local FWS and which corresponds to the target logical address). The LC can include a linked list which represents a time-ordered list of logged write I/O operations. Each of the logged write I/O operations on the list can be represented by a corresponding PDESC. The list of the LC can be a linked list of pointers to the primary node's memory local copy of PDESCs describing the write I/O operations to logical addresses included in the LUN LBA range associated with the LC.

1026 — After the PDESC and PB for the write I/O have been persistently stored in the log, the initiator node returns a reply or acknowledgement for the write I/O operation to the client which sent the write I/O operation.

1102 — Each of the nodes A and B can maintain its own node local pointer which points to, or references, the next LC in the node's local FWS to be considered as a candidate for flushing by the node. For example, cursor A can denote the next LC in node A's local FWS considered as a candidate for flushing by the node A; and cursor B can denote the next LC in node B's local FWS considered as a candidate for flushing by the node B.

1104 — The node determines which of the two nodes, A or B, is the owner (flush owner) of the next LC referenced by the cursor. The owner of an LC denotes the node which handles flushing the list of PDESCs of the LC, where the PDESCs represent persistently logged write operations that write data to target logical addresses that are included in the LUN LBA range associated with the LC.
Determining the flush owner of the next LC uses the two counters, COUNT A and COUNT B, of the LC as follows:
    If COUNT A > COUNT B, then the flush owner is the node A.
    If COUNT A < COUNT B, then the flush owner is the node B.
    If COUNT A == COUNT B, use as alternate technique for deciding the flush owner of the next LC referenced by the cursor.
In at least one embodiment, the alternate technique can include obtaining a hash value HV by applying a hash function to the starting LBA of the LUN LBA range associated with the next LC. One or more specific bit values of the HV can be examined and used to determine the flush owner. For example, the value of the MSB (most significant bit) of the HV can examined where if the MSB=0, then a predetermined one of the two nodes A and B, such as node A, can be selected as the flush owner; and otherwise where the MSB=1, the remaining one of the two nodes, such as node B, can be selected as the flush owner.

1106 — If the node performing the processing is determined as the flush owner of the next LC referenced by the cursor. Otherwise, if the node determines that the flush owner is alternatively the peer node, then the node does not flush the next LC and advances the cursor to the next subsequent LC in the node's local FWS, then the node can perform processing to flush the next LC referenced by the cursor. Otherwise, if the node determines that the flush owner is alternatively the peer node, then the node does not flush the next LC and advances the cursor to the next subsequent LC in the node's local FWS for evaluation as a candidate for flushing by the node. Generally, a node only flushes LCs for which the node determines that it is the flush owner.

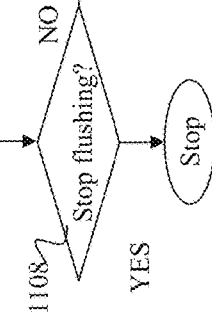

1108 Stop flushing?
YES → Stop
NO → (loop back)

FIG. 17

CONTAINER FLUSH OWNERSHIP ASSIGNMENT

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium comprising: receiving a plurality of write operations at a data storage system including a plurality of nodes comprising a first node and a second node, wherein the plurality of write operations write to a plurality of target logical addresses included in a first logical block address (LBA) range; maintaining a first counter and a second counter of a first container associated with the first LBA range, wherein the first container is associated with a first list of recorded write operations of a log having target logical addresses in the first LBA range, wherein the first list includes a first plurality of page descriptors (PDESCs) corresponding to entries of the log for the plurality of write operations, wherein the first counter indicates how many of the plurality of write operations are received at the first node and the second counter indicates how many of the plurality of write operations are received at the second node, wherein, for each of the plurality of write operations received by the first node, the first node stores write data written by said each write operation in a first cache local to the first node, and for each of the plurality of write operations received by the second node, the second node stores write data written by said each write operation in a second cache local to the second node; performing first processing to determine a flush owner of the first container, said first processing including: comparing the first counter and the second counter; responsive to said comparing determining the first counter is greater than the second counter, assigning the first node as the flush owner of the first container; responsive to said comparing determining the second counter is greater than the first container, assigning the second node as the flush owner of the first container; and responsive to said comparing determining that the first counter is equal to the second counter, performing second processing to determine which of the first node and the second node is the flush owner of the first container; and the flush owner of the first container flushing the first list of recorded write operations of the log associated with the first container.

In at least one embodiment, the first LBA range associated with the first container can be from a starting LBA to an ending LBA. The second processing can include: determining, using a hash function, a hash value for the starting LBA of the first container; determining the most significant bit of the hash value; and responsive to the most significant bit of the hash value being zero, assigning one node of the first node and the second as the flush owner of the first container, and otherwise assigning a remaining one of the first node and the second node as the flush owner of the first container. Each PDESC of the first plurality of PDESCs of the first list can reference a page block (PB) storing write data written by one of the plurality of write operations represented by said each PDESC. The first node can include a first flush working set (FWS) comprising a first plurality of containers each associated with a corresponding list of recorded write operations of the log having target logical addresses in a corresponding LBA range associated with said each container. The second node can include a second FWS comprising a second plurality of containers each associated with a corresponding list of recorded write operations of the log having target logical addresses in a corresponding LBA range associated with said each container.

In at least one embodiment, the first FWS of the first node can include the first container, and the second FWS of the second node can include a second container associated with the first LBA range. The second container can be associated with a second list of recorded write operations of the log having target logical addresses in the first LBA range. The second list can include a second plurality of page descriptors (PDESCs) corresponding to entries of the log for the plurality of write operations. The second container can include a third counter and a fourth counter, where the third counter indicates how many of the plurality of write operations are received at the first node and the fourth counter indicates how many of the plurality of write operations are received at the second node. For each of the plurality of write operations received by the first node, the first list of the first container of the first FWS can include a corresponding PDESC for said each write operation where the corresponding PDESC references a cache location, in the first cache local to the first node, storing write data written by said each write operation. For each of the plurality of write operations received by the second node, the second list of the second container of the second FWS can include a corresponding PDESC for said each write operation where the corresponding PDESC references a cache location, in the second cache local to the second node, storing write data written by said each write operation.

In at least one embodiment, a first write operation of the plurality of write operations can be received by one of the first node and the second node, wherein said one node can be referred to as an initiator node with respect to the first write operation, wherein one of the first node and the second node can be designated as a primary node and a remaining one of the first node and the second node can be designated as a secondary node. Processing for the first write operation of the plurality of write operations can include: the primary node determining whether the first FWS includes the first container thereby indicating that the first write operation is an initial write to the first container of the first FWS; responsive to the primary node determining that the first FWS does not include the first container, the primary node allocating the first container; the primary node incrementing an appropriate one of the first counter and the second counter of the first container in accordance with which one of the first node and the second node is the initiator node with respect to the first write operation; and the primary node sending a commit message to the secondary node. Responsive to the secondary node receiving the commit message, the secondary node can perform secondary node processing comprising: the secondary node persistently storing information in a PDESC of the log for the first write operation; the secondary node determining whether the second FWS includes the second container thereby indicating that the first write operation is an initial write to the second container of the second FWS; responsive to the secondary node determining that the second FWS does not include the second container, the secondary node allocating the second container; the secondary node adding a first PDESC for the first write operation as an entry to the second list of the second container; the secondary node incrementing an appropriate one of the third counter and the fourth counter of the second container in accordance with which one of the first node and the second node is the initiator node with respect to the first write operation; and the secondary node returning a response to the primary node acknowledging the commit message. Responsive to the primary node receiving the response from the secondary node, the primary node adding a second PDESC for the first write operation as an entry to the first list of the first container.

In at least one embodiment, the first FWS can be stored in a first volatile memory of the first node and accessed by a first plurality of flusher threads executing on the first node in connection with flushing any of the first plurality of containers for which the first node is flush owner, and wherein the second FWS can be stored in a second volatile memory of the second node and accessed by a second plurality of flusher threads executing on the second node in connection with flushing any of the second plurality of containers for which the second node is flush owner. The first node can determine flush ownership for the first plurality of containers using a corresponding pair of counters of each of the first plurality of containers, wherein each corresponding pair of counters for an associated one of the first plurality of containers includes one counter, indicating how many logged write operations associated with said associated one container are received by the first node, and includes another counter, indicating how many logged write operations associated with said one container are received by the second node. The second node can determine flush ownership for the second plurality of containers using a corresponding pair of counters of each of the second plurality of containers, wherein each corresponding pair of counters for an associated one of the second plurality of containers includes one counter, indicating how many logged write operations associated with said associated one container are received by the first node, and includes another counter, indicating how many logged write operations associated with said one container are received by the second node.

In at least one embodiment, for each of the first plurality of containers, the first node can perform third processing to determine flush ownership, comprising: comparing said one counter and said another counter of the corresponding pair of counters of said each of first plurality of containers; responsive to determining that said one counter is greater than said another counter, assigning the first node as the flush owner of said each of the first plurality of containers; responsive to determining that said another counter is greater than said one counter, assigning the second node as the flush owner of said each of the first plurality of containers; responsive to determining that the one counter is equal to the another counter, performing other processing to determine which of the first node and the second node is the flush owner of said each of the first plurality of containers; and the first node flushing recorded write operations of the log associated with any of the first plurality of containers which the first node determines that the first node is the flush owner. For each of the second plurality of containers, the second node can perform third processing to determine flush ownership, comprising: comparing said one counter and said another counter of the corresponding pair of counters of said each of second plurality of containers; responsive to determining that said one counter is greater than said another counter, assigning the first node as the flush owner of said each of the second plurality of containers; responsive to determining that said another counter is greater than said one counter, assigning the second node as the flush owner of said each of the second plurality of containers; responsive to determining that the one counter is equal to the another counter, performing other processing to determine which of the first node and the second node is the flush owner of said each of the first plurality of containers; and the second node flushing recorded write operations of the log associated with any of the first plurality of containers which the second node determines that the second node is the flush owner.

In at least one embodiment, each of the first plurality of containers of the first FWS of the first node can have a corresponding container included in the second plurality of containers of the second FWS of the second node, and wherein said each container of the first plurality and its corresponding container of the second plurality both can be associated with a same set of recorded write operations of the log.

In at least one embodiment, a metadata (MD) structure of mapping information can be used to map logical addresses, including the plurality of target logical addresses, to corresponding physical storage locations including content stored at the logical addresses. The MD structure can be a hierarchical structure including a plurality of MD leaf pages each associated with a contiguous range of LBAs of a logical device, wherein the first LBA range can be a first contiguous LBA range associated with a first MD leaf page of the plurality of MD leaf pages. Each of the plurality of MD leaf pages can have a corresponding LBA range and can be associated with a first corresponding container of the first plurality of containers of the first FWS including logged writes with target logical addresses in the corresponding LBA range, and also associated with a second corresponding one of the second plurality of containers of the second FWS including logged writes with target logical addresses in the corresponding LBA range.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 14, 15, 16 and 17 illustrate data flow and processing steps performed in an embodiment in accordance with the techniques of the present disclosure.

DETAILED DESCRIPTION OF EMBODIMENT(S)

Figure 1:
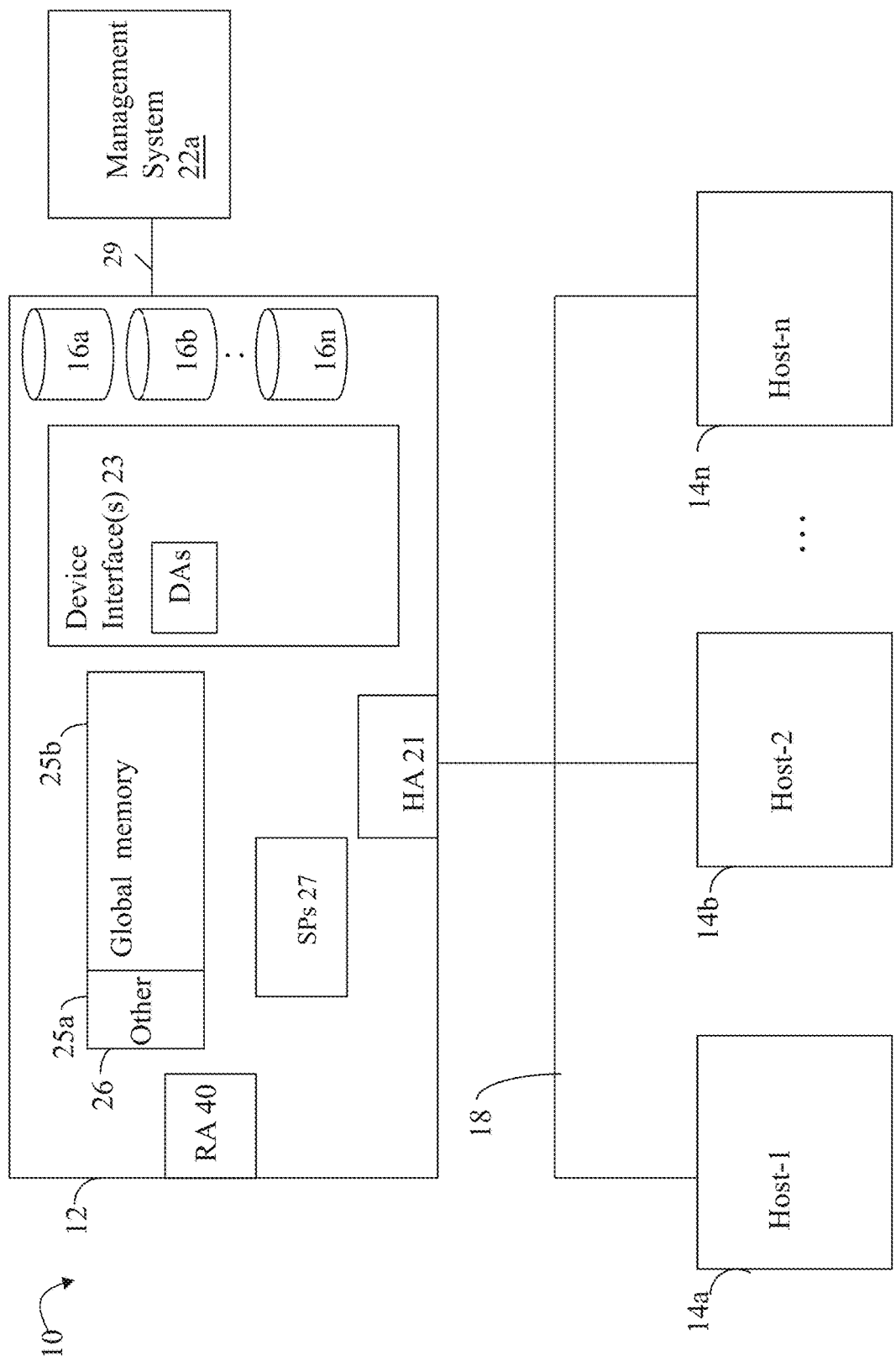
FIG. 1 is an example of components of at least one embodiment of system in accordance with the techniques of the present disclosure.

A system such as a data storage system can be a log-based system where writes, as well as possibly other operations, can be persistently stored in a log. At a later point in time, entries of the log can be flushed and data written by the logged writes can be further persisted to back-end (BE) or long-term persistent storage. The system can include multiple processing nodes, or nodes, which can receive operations such as write operations recorded in the log.

Different techniques can be used in connection with determining which nodes flush what entries of the log. In at least one embodiment, a concept of ownership, or flush ownership, can be applied to a container of logged records or operations. The container can be generally characterized as a logical grouping of a portion of persistently stored log records or operations of the log. Each container of log records or operations can be assigned an owner that is one of the nodes in the system. The owner of a container is the designated node that is responsible for flushing all log records of the container.

In some systems, the access path states are in accordance with a standard or protocol such as the SCSI Asymmetrical Logical Unit Access (ALUA) standard. The ALUA standard specifies a mechanism for asymmetric or symmetric access of a volume, logical device or LUN. ALUA allows the data storage system to set a LUN's access state with respect to a path between particular initiator port and the target port.

Thus, in accordance with the ALUA standard, various access states (also sometimes referred to herein as ALUA states or path states) can be associated with a path with respect to a particular device, such as a LUN. In particular, the ALUA standard defines such access states including the active-optimized (sometimes referred to herein as preferred), active-non optimized (sometimes referred to herein as non-preferred), and unavailable states as described herein. The ALUA path states for a particular LUN accessed over particular target ports of one node of the system can be set to active-optimized or preferred while setting ALUA path states for the particular LUN accessed over particular target ports of the second remaining node of the system to active non optimized or non-preferred. The host can send I/Os directed to the LUN over paths to a single one of the nodes designated as active optimized or preferred. In this manner, I/Os directed to the particular LUN can be sent to a single node of the system.

In such a system using the ALUA path states, ownership of a container can be dynamic and determined by the initial or first (e.g., in time) ingestion of a write operation directed to an LBA falling into the LBA range associated with the container. An ingestion of a write operation can refer to the process of receiving and servicing a write operation by a node. With respect to a particular volume or LUN using the ALUA path states, paths to only one of the nodes of the system can be designated as active optimized or preferred so that all I/Os directed to the particular volume are LUN can be expected to be received at only the one node of the system. In this case, the one node of the system having the associated active optimized or preferred path states can receive the initial write to a container having an LBA range associated with the LUN, where the one node receiving the initial write to the container can be designated as the owner or flush owner of the container. The one node designated as the owner of the container can be expected to receive write I/Os directed to the LUN and therefore likely have in its node local volatile memory a copy of the data written by the write I/Os directed to the LUN, where such write I/Os are be recorded as log records of the container owned by the one node.

Such techniques as noted above provide for flushing with optimized cache locality based on use of ALUA. In particular, the foregoing assignment of a container to a particular node for flushing is optimized for configurations where the ALUA path states direct the I/Os of a particular LUN to a single node, for example, where the ALUA path states to node A for the LUN are active optimized and where the ALUA path states to node B for the LUN are non-optimized.

However, it is desirable to have a solution and techniques used in connection with assigning flush ownership of containers of logged writes which optimizes cache locality even in non-ALUA based configurations.

Described in the following paragraphs are techniques that provide for efficiently assigning flush ownership to containers. The techniques provide for dynamic flush ownership assignment to containers which optimize cache locality even in non-ALUA based configurations. The techniques of the present disclosure provide for a consistent and synchronized view among the two nodes of the system of ownership of the various containers of log records. Such a synchronized view of container ownership avoids, for example, concurrent flushing of the same container by both nodes of the system.

In at least one embodiment in accordance with the techniques of the present disclosure, data locality and expected cache locality can be considered as optimizations to provide for efficient flushing of the log. In at least one embodiment, each container can include log records for write operations that write data to a specified range of target addresses or locations. For example, each container can be associated with a particular portion or range of LBAs of a particular LUN so that a logged write operation that writes data to a target address falling into the associated range of the container is included in the container. In this manner, at least one embodiment of the techniques of the present disclosure provides for data flushing of the log while taking into account data locality so that user data pages or blocks related to the same LBA range can be preferably flushed together. In at least one embodiment, log records associated with the same metadata (MD) leaf page (in some contexts also referred to as MD leaf) can be included in the same container and flushed together. The MD leaf can be a particular page of MD included in the mapping information as discussed elsewhere herein that maps a logical address, such as a LUN and LBA of the LUN, to a corresponding physical storage location storing the content or data of the logical address. The physical storage location can be on a BE PD providing non-volatile storage for the logical address.

In at least one embodiment, expected cache locality can also be considered in that the flush owner or owning node of a container that is responsible for flushing the log records of the container can be determined based on observed counts of the logged write I/Os that are received and ingested by each of the nodes. For a container of logged write I/Os having target logical addresses in the contiguous LBA range associated with a container, the node having the greatest associated count of received ingested logged write I/Os can be designated as the flush owner of the container.

In at least one embodiment, maintaining the dynamic ownership aspect of containers of log records can be performed efficiently without introducing additional internode synchronization during flushing. Once a particular set of containers has been frozen so that no additional writes are logged to the containers, each node can independently determine the ownership of the containers of the frozen set without further internode communication or synchronization to determine container ownership The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 can be connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, also be located in different physical locations. The communication medium 18 used for communication between the host systems 14a-14n and the data storage system 12 of the system 10 can use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques of the present disclosure. It should also be noted that an embodiment can include data storage arrays or other components from one or more vendors.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs can refer to solid state electronics devices as distinguished from electromechanical devices, such as hard drives, having moving parts. Flash devices or flash memory-based SSDs are one type of SSD that contains no moving mechanical parts. The flash devices can be constructed, for example, using nonvolatile semiconductor NAND flash memory.

The data storage system can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA)

or other adapter which facilitates host communication. The HA 21 can be characterized as a front end component of the data storage system which receives a request from one of the hosts 14a-n. The data storage system can include one or more RAs used, for example, to facilitate communications between data storage systems. The data storage system can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage system. In one embodiment, the device interfaces 23 can perform data operations using a system cache that can be included in the global memory 25b, for example, when communicating with other device interfaces and other components of the data storage system. The other portion 25a is that portion of the memory that can be used in connection with other designations that vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 can also provide data to the host systems 14a-n also through the channels. The host systems 14a-n do not address the drives or devices 16a-16n of the storage systems directly, but rather access to data can be provided to one or more host systems from what the host systems view as a plurality of logical devices, logical volumes (LVs) which can also referred to herein as volumes or logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage referenced by such logical unit numbers. The LUNs may or may not correspond to the actual or physical disk drives or more generally physical storage devices. For example, one or more LUNs can reside on a single physical disk drive, data of a single LUN can reside on multiple different physical devices, and the like. Data in a single data storage system can be accessed by multiple hosts allowing the hosts to share the data residing therein. The HAs can be used in connection with communications between a data storage system and a host system. The RAs can be used in facilitating communications between two data storage systems. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques of the present disclosure, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques of the present disclosure can be made with respect to a physical data storage system and its physical components (e.g., physical hardware for each HA, DA, HA port and the like), the techniques of the present disclosure can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a can be a computer system which includes data storage system management software or application executing in a web browser. A data storage system manager can, for example, view information about a current data storage configuration such as LUNs, groups of LUNs, and the like, on a user interface (UI) in a display device of the management system 22a. Alternatively, and more generally, the management software can execute on any suitable processor in any suitable system. For example, the data storage system management software can execute on a processor of the data storage system 12.

In some embodiments, each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target logical address from which data is read from, or written to, depending on whether the I/O operation is, respectively, a read or a write operation request. The target logical address of the received I/O operation can be expressed in terms of a LUN or volume and logical address or offset location (e.g., LBA or logical block address) on the LUN. Processing can be performed on the data storage system to further map the target logical address of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system that includes multiple storage processors (SPs). Each of the SPs 27 can y be a CPU including one or more "cores" or processors and each can have their own memory used for communication between the different front end and back end components rather than utilize a global memory accessible to all storage processors. In such embodiments, the memory 26 can represent memory of each such storage processor.

Generally, the techniques of the present disclosure can be used in connection with any suitable storage system, appliance, device, and the like, in which data is stored.

The data path or I/O path can be characterized as the path or flow of I/O data through a system. For example, the data or I/O path is the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12.

The data path and control path define two sets of different logical flow paths. In at least some of the data storage system configurations, at least part of the hardware and network connections used for each of the data path and control path can differ. For example, although both control path and data path generally use a network for communications, some of the hardware and software used can differ. For example, with reference to the FIG. 1, a data storage system can have a separate physical connection 29 from a management system 22a to the data storage system 12 being managed whereby control commands are issued over such a physical connection 29. However, user I/O commands may never be issued over such a physical connection 29 provided solely for purposes of connecting the management system to the data storage system. In any case, the data path and control path each define two separate logical flow paths.

Figure 2:
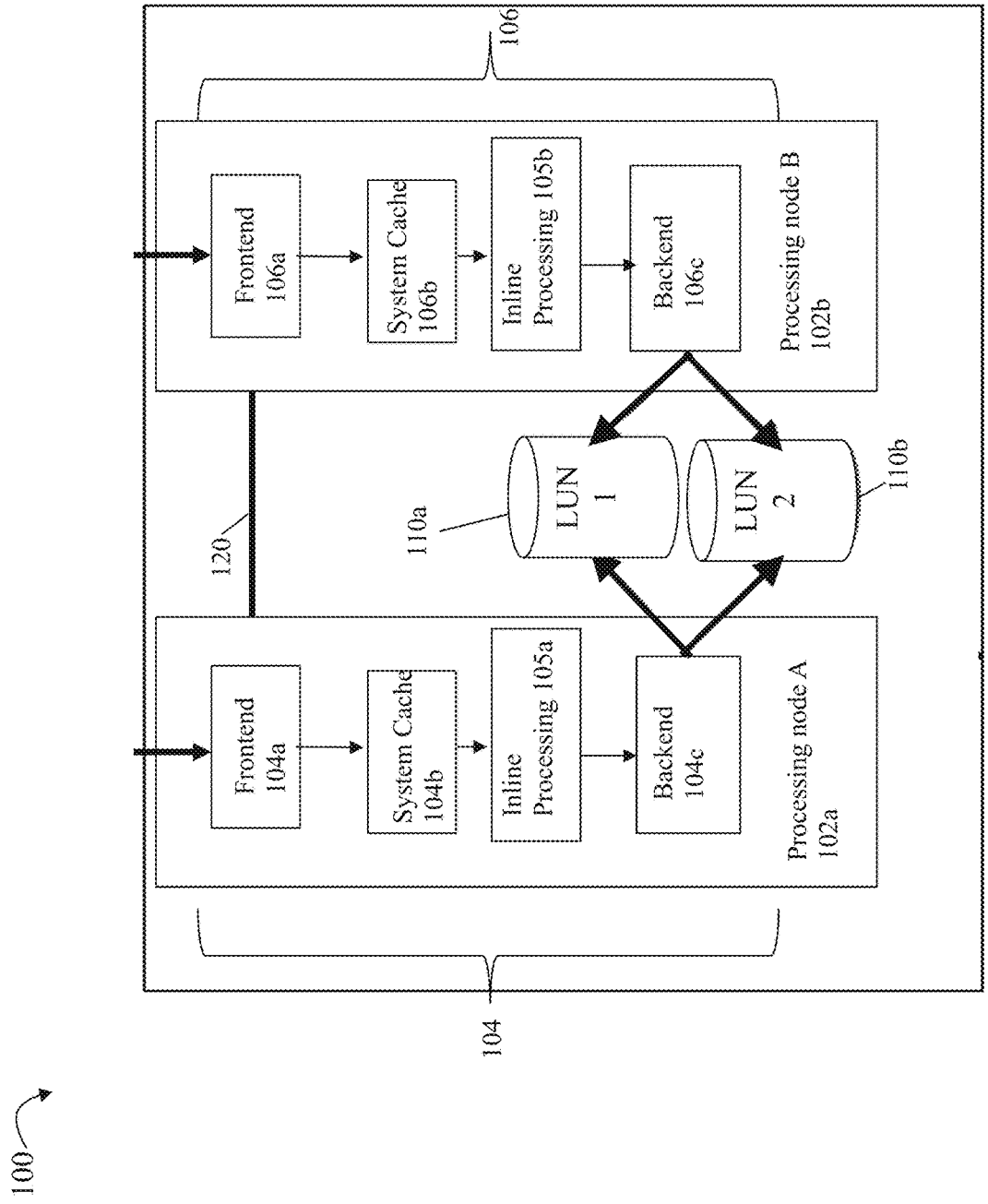
FIG. 2 is an example illustrating the I/O path or data path in connection with processing data in an embodiment in accordance with the techniques of the present disclosure.

With reference to the FIG. 2, shown is an example 100 illustrating components that included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is referred to herein as an active-active configuration.

In connection with a write operation received from a host, or other external client, and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a. In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment.

Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Thus, in such an embodiment, rather than have dedicated hardware for an FA, DA, and the like, the components described above for the FA, DA, RA, and the like, can be viewed as logical or functional components where the tasks of such components can be implemented by code executed by processors of the nodes as illustrated in FIG. 2. Each node of the pair can include its own resources such as its own local (i.e., used only by the node) resources such as local processor(s), local memory, and the like.

Consistent with other discussion herein, a cache can be used for caching write I/O data and other cached information. The other cached information can include, for example, cached operations or commands such as create snapshot commands. In one system, the cache can be implemented using multiple caching devices or PDs, such as non-volatile (NV) SSDs such as NVRAM devices that are external with respect to both of the nodes or storage controllers. The caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein.

In the following paragraphs, the one or more caching devices or PDs provides a persistent cache that can be referred to as a data journal, log or log tier used in the data storage system. In such a system, the caching devices or PDs are non-volatile log devices or PDs upon which the log is persistently stored. In at least one embodiment, in addition to such a persistently stored log, one or more of the nodes can also include node-local in-memory copies of information of the log. In at least one embodiment, the node-local in-memory copies of information of the log stored on each node can be stored in volatile memory, such as a RAM, that is local to the node and can be accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log can be used to optimize write operation latency.

Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 3:
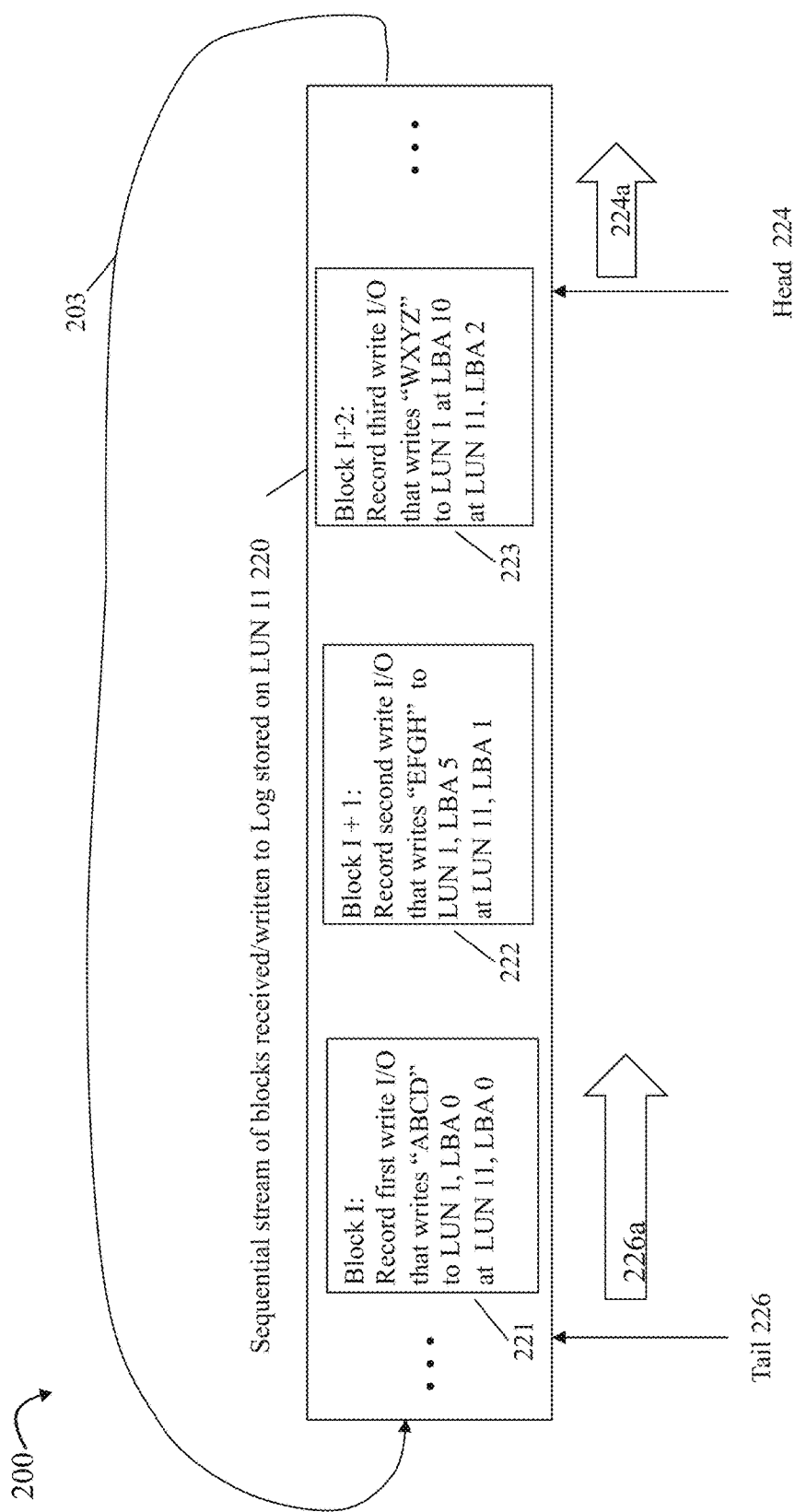
FIGS. 3, 4 and 5 are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
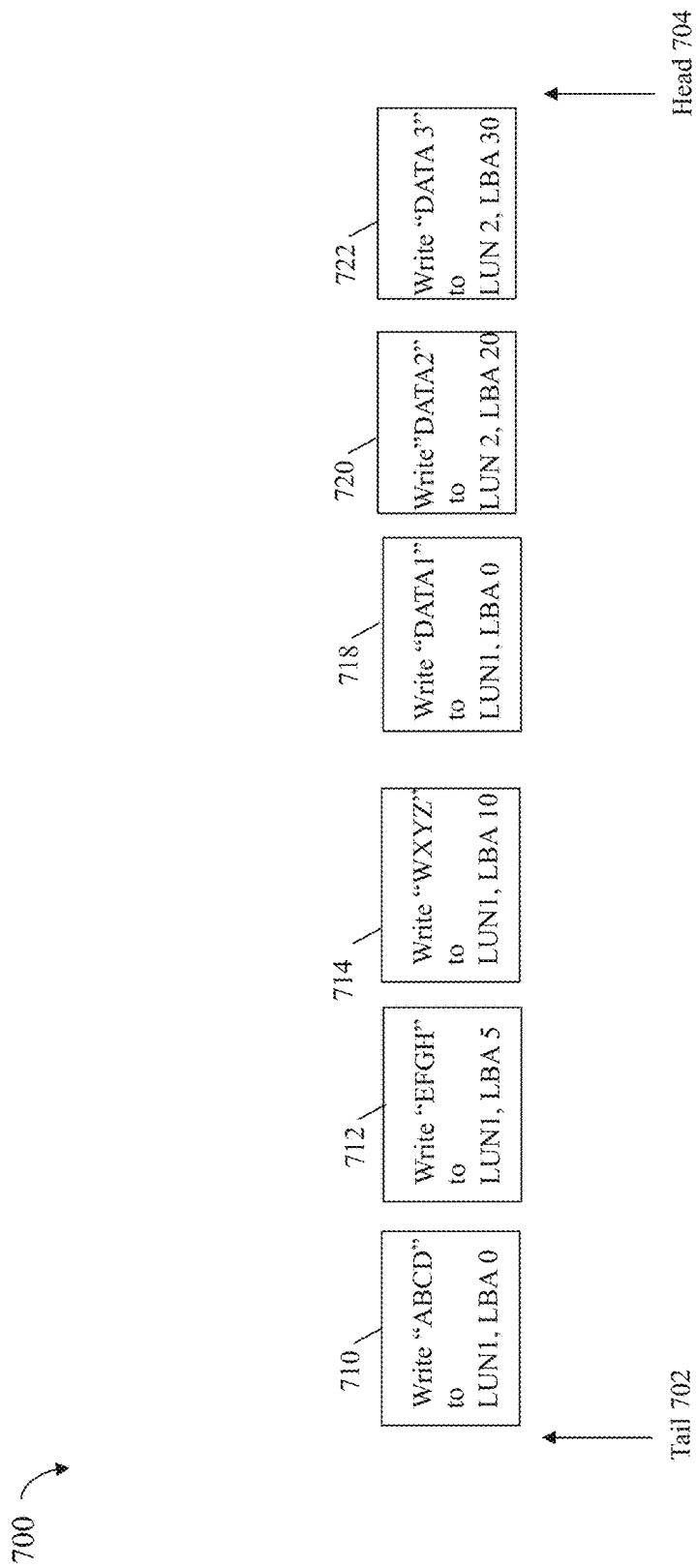

Referring to FIG. 4, shown is an example of information that can be included in a log in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 5:
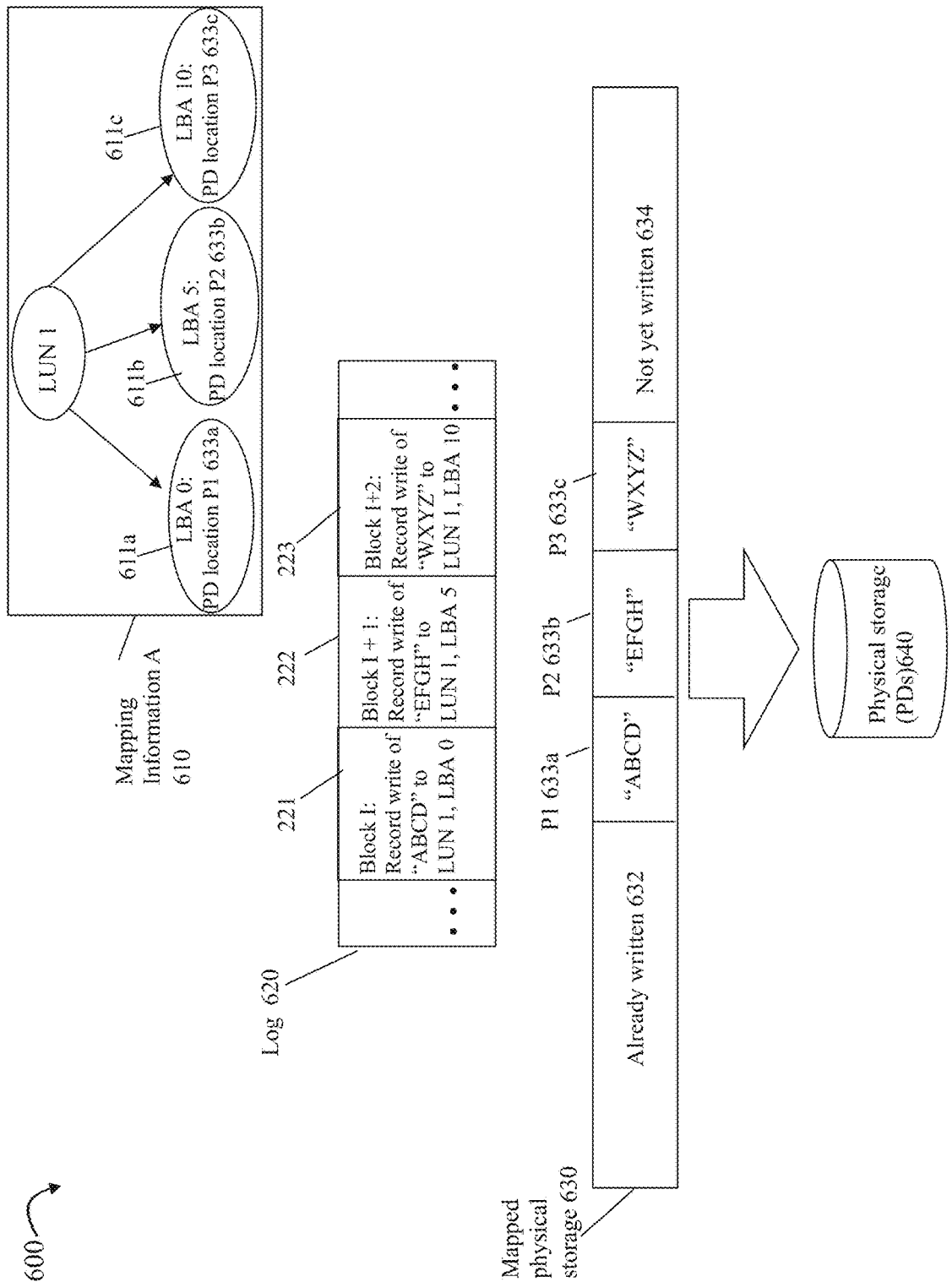

Referring to FIG. 5, shown is an example 600 illustrating the flushing of logged writes and the physical data layout of user data on BE PDs in at least one embodiment in accordance with the techniques of the present disclosure. FIG. 5 includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

In at least one embodiment with a dual node appliance or data storage system such as illustrated in FIG. 2, one of the two nodes can be designated as the primary node with the other peer node designated as the secondary or non-primary peer node.

Different techniques can be used in connection with determining which nodes flush what entries of the log. In at least one embodiment, a concept of ownership, or flush ownership, can be applied to a container of logged records or operations. The container can be generally characterized as a logical grouping of a portion of persistently stored log records or operations of the log. Each container of log records or operations can be assigned an owner that is one of the nodes in the system. The owner of a container is the designated node that is responsible for flushing all log records of the container.

In some systems, the access path states are in accordance with a standard or protocol such as the SCSI Asymmetrical Logical Unit Access (ALUA) standard. The ALUA standard specifies a mechanism for asymmetric or symmetric access of a volume or LUN. ALUA allows the data storage system to set a LUN's access state with respect to a path between particular initiator port and the target port. Thus, in accordance with the ALUA standard, various access states (also sometimes referred to herein as ALUA states or path states) can be associated with a path with respect to a particular device, such as a LUN. In particular, the ALUA standard defines such access states including the active-optimized (sometimes referred to herein as preferred), active-non optimized (sometimes referred to herein as non-preferred), and unavailable states as described herein. The ALUA path states for a particular LUN accessed over particular target ports of one node of the system can be set to active-optimized or preferred while setting ALUA path states for the particular LUN accessed over particular target ports of the second remaining node of the system to active non optimized or non-preferred. The host can send I/Os directed to the LUN over paths to a single one of the nodes designated as active optimized or preferred. In this manner, I/Os directed to the particular LUN can be sent to a single node of the system.

In such a system using the ALUA path states, ownership of a container can be dynamic and determined by the initial or first (e.g., in time) ingestion of a write operation directed to an LBA falling into the LBA range associated with the container. An ingestion of a write operation can refer to the process of receiving and servicing a write operation by a node. With respect to a particular volume or LUN using the ALUA path states, paths to only one of the nodes of the system can be designated as active optimized or preferred so that all I/Os directed to the particular volume are LUN can be expected to be received at only the one node of the system. In this case, the one node of the system having the associated active optimized or preferred path states can receive the initial write to a container having an LBA range associated with the LUN, where the one node receiving the initial write to the container can be designated as the owner or flush owner of the container. The one node designated as the owner of the container can be expected to receive write I/Os directed to the LUN and therefore likely have in its node local volatile memory a copy of the data written by the write I/Os directed to the LUN, where such write I/Os are be recorded as log records of the container owned by the one node.

Such techniques as noted above provide for flushing with optimized cache locality based on use of ALUA. In particular, the foregoing assignment of a container to a particular node for flushing is optimized for configurations where the ALUA path states direct the I/Os of a particular LUN to a single node, for example, where the ALUA path states to node A for the LUN are active optimized and where the ALUA path states to node B for the LUN are non-optimized.

However, it is desirable to have a solution and techniques used in connection with assigning flush ownership of containers of logged writes which optimizes cache locality even in non-ALUA based configurations.

Described in the following paragraphs are techniques that provide for efficiently assigning flush ownership to containers. The techniques provide for dynamic flush ownership assignment to containers which optimize cache locality even in non-ALUA based configurations. The techniques of the present disclosure provide for a consistent and synchronized view among the two nodes of the system of ownership of the various containers of log records. Such a synchronized view of container ownership avoids, for example, flushing of the same container by both nodes of the system.

In at least one embodiment in accordance with the techniques of the present disclosure, data locality and expected cache locality can be considered as optimizations to provide for efficient flushing of the log. In at least one embodiment, each container can include log records for write operations that write data to a specified range of target addresses or locations. For example, each container can be associated with a particular portion or range of LBAs of a particular LUN so that a logged write operation that writes data to a target address falling into the associated range of the container is included in the container. In this manner, at least one embodiment of the techniques of the present disclosure provides for data flushing of the log while taking into account data locality so that user data pages or blocks related to the same LBA range can be preferably flushed together. In at least one embodiment, log records associated with the same metadata (MD) leaf page (in some contexts also referred to as MD leaf) can be included in the same container and flushed together. The MD leaf can be a particular page of MD included in the mapping information as discussed elsewhere herein that maps a logical address, such as a LUN and LBA of the LUN, to a corresponding physical storage location storing the content or data of the logical address. The physical storage location can be on a BE PD providing non-volatile storage for the logical address.

In at least one embodiment, expected cache locality can also be considered in that the flush owner or owning node of a container that is responsible for flushing the log records of the container can be determined based on observed counts of the logged write I/Os that are received and ingested by each of the nodes. For a container of logged write I/Os having target logical addresses in the contiguous LBA range associated with a container, the node having the greatest associated count of received ingested logged write I/Os can be designated as the flush owner of the container.

In at least one embodiment, maintaining the dynamic ownership aspect of containers of log records can be performed efficiently without introducing additional internode synchronization during flushing to decide container ownership. Once a particular set of containers has been frozen so that no additional writes are logged to the containers, each node can independently determine the ownership of the containers of the frozen set without further internode communication or synchronization.

In at least one embodiment, the techniques provide for independent node flushing without having a single component responsible for orchestrating and distributing the log records for flushing among the two nodes. In such an embodiment, logged write operations of a particular container can be flushed from the log by the node that received the most of the logged write operations of the particular container, where the data written by the logged write operations may likely be in the volatile memory cache of the node. Thus selecting the node which has received the most such logged writes of the container denotes the node expected to have the largest number of written data blocks or pages in its node-local volatile memory cache.

The foregoing and other aspects of the techniques of the present disclosure are described in more detail in illustrative examples in the following paragraphs.

In embodiments in accordance with the techniques of the present disclosure, write operations can be recorded in the log using different object types or structure. A first structure of the log can include records of the data written by the received write operations, and a second structure of the log can include records that are descriptors for the received write operations. For example, the write operation data or payload can be stored in a record of the first structure in the log. Additionally, a descriptor for the write operation can be stored in a record of the second structure in the log, where the descriptor can reference a record in the first structure including the write data written by the write operation. In at least one embodiment, the foregoing first structure recording the write data payload can be generally a pool of data blocks; and the second structure of descriptors can be a ring buffer. A ring buffer is generally known in the art. A ring buffer is a ring of records or entries. The ring buffer can be maintained using pointers, such as a head pointer and a tail pointer, where new entries of the ring can be allocated from the head and space reclamation can be done from the tail. When an entry at the tail is flushed, the entry can be freed and thus reclaimed for reuse. The tail can be advanced as entries are flushed. In a similar manner, as entries are allocated, the head pointer is advanced. Although particular structures, such as a ring buffer, are described herein, more generally, any suitable structure and/or organization can be utilized with the techniques of the present disclosure.

Figure 6:
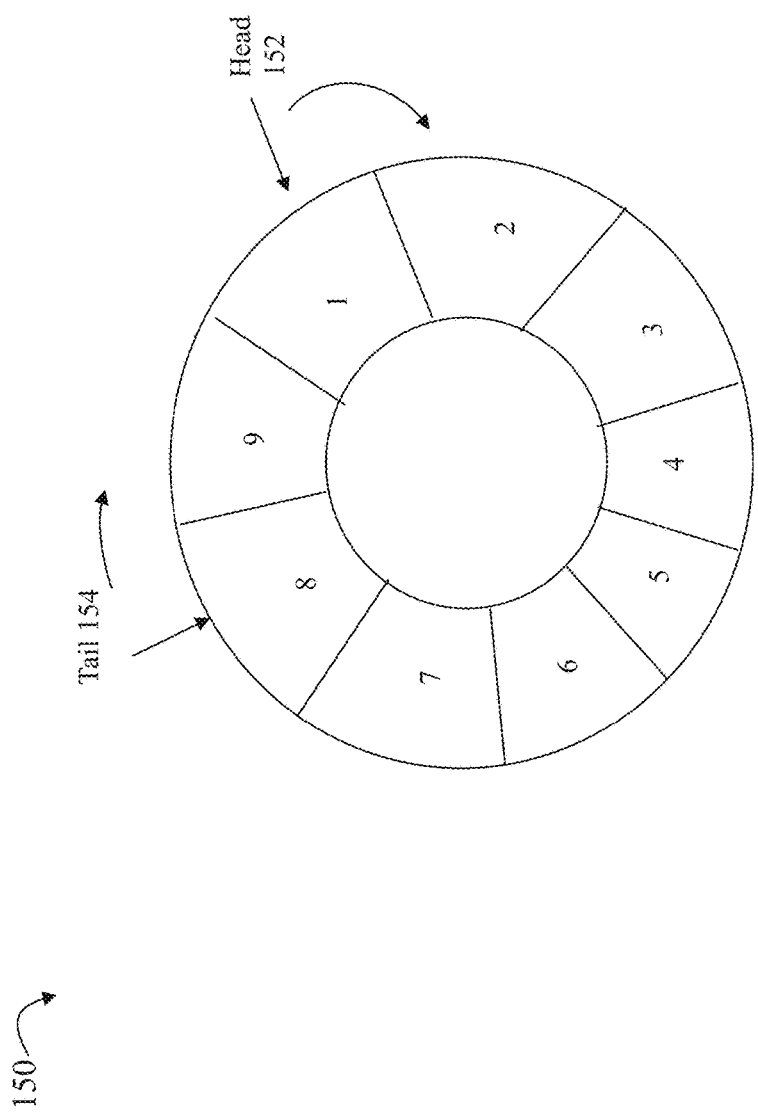
FIG. 6 is an example of a ring buffer structure that can be used in at least one embodiment in accordance with the techniques of the present disclosure.

Referring to FIG. 6, shown is an example 150 illustrating a ring buffer. The ring buffer 150 can be managed using the head pointer 152 and the tail pointer 154. Both pointers are advanced in the clockwise flow in this example. Entries are allocated from the head of the list as denoted by the head pointer 152. For example, the entry 1 can be allocated by the head pointer 152. Subsequently, the head pointer 152 is advanced to the entry 2 since entry 2 is the next entry to be allocated when needed. The tail pointer 154 can denote the entry in the ring buffer that is to be flushed next or is currently being flushed. For example, the tail pointer 154 is currently pointing to entry 8. Once entry 8 is flushed, the tail pointer 154 is advanced to entry 9 that is flushed. The ring buffer allocates new entries in a FIFO (first in first out) manner from the head pointer based on the sequential positioning in the buffer as denoted by the entry numbers 1 through 9. In at least one embodiment for ring buffer management, both the "full" and "empty" cases of the ring buffer can look the same where the head pointer 152 and the tail pointer are equal or point to the same entry in the ring buffer. In the full case, all entries in the ring buffer are allocated and in the empty case, all entries in the ring buffer are free or available for use. Any suitable technique can be used to distinguish between the full and empty ring buffer cases when the head pointer and the tail pointer point to the same entry. For example, a count can be maintained for the ring buffer denoting the number of allocated entries. The count can be initialized to 0, incremented each time an entry is allocated by the head pointer advancing, and decremented each time an entry is flushed and reclaimed by advancing the tail pointer.

In at least one embodiment, the ring buffer can be implemented using an array where, for example, the entries 1 through 9 as in FIG. 6 correspond to array indices. The circular nature of the ring buffer can be implemented using the linear array by considering the sequential array indices as if connected end to end or as a contiguous sequential array of elements. Once the head or tail pointer reaches entry 9, the head or tail pointer continues with the next entry in the sequence which is entry 1. In this manner the entries or indices of the linear array form a logical loop or ring as illustrated in the FIG. 6.

In at least one embodiment, both the first structure of logged data can be a pool of page blocks (PBs) where each PB includes the write data of a single logged write data block. The second structure of logged descriptors can be implemented as a ring buffer of page descriptors (PDESCs) where each PDESC includes a descriptor of a single logged request such as a write operation. For a write operation that writes a block of data, the logged write operation can be described by a PDESC of the log, the data written can be stored in a PB of the log, and the PDESC of the log can include a reference to the PB containing the data written. In some systems, requests or operations in addition to write operations can be recorded in the log using PDESCs where such PDESCs of these additional requests or operations may not have an associated PB.

In at least one embodiment, the size of each PB can generally be much larger than each PDESC. For example, in at least one embodiment, each PB can be 4K bytes or 8K bytes in size, and each PDESC can be ½ Kbyte or smaller. Thus generally, the total amount of storage used for the PBs of the log is much greater than the total amount of storage used for the PDESCs of the log.

It should be noted that the flushing of the log can be performed in response to an occurrence of any one or more defined conditions. For example, the log can be flushed in response to determining that the amount of reclaimed log space available for use and allocation is less than a specified threshold amount or size. As another example, the log can be flushed in response to determining that the amount of reclaimed PB space available for use and allocation is less than a specified threshold amount or size. As another example, the log can be flushed in response to determining that the amount of reclaimed PDESC space available for use and allocation is less than a specified threshold amount or size.

In at least one embodiment, the process of flushing the log includes flushing PDESCs and associated PBs of the log. In such an existing system, PDESC-PB pairs can be flushed, where each PDESC-PD pair denotes a logged write operation of a data block, and the PDESC of the pair points to or references the PB of the same pair. Multiple PDESC-PB pairs can be aggregated and flushed as a working set or unit. The particular PDESC-PB pairs flushed in the same working set or unit can be based on an application locality policy. For example, multiple PDESC-PB pairs included in the same working set can be flushed together where the PDESC-PB pairs of the working set write data to related logical addresses, such as LBAs of a LUN within the same contiguous logical address subrange. In some systems, multiple working sets of PDESC-PB pairs can be flushed in parallel by different flusher threads or processes of one or more nodes of the data storage system. As each PDESC-PB pair is flushed from the log to the BE PDs, the log space associated with the flushed PDESC and PB can be freed and reclaimed for reuse.

In at least one embodiment where the PBs are implemented using a pool of PBs, the PBs can be organized and maintained as a pool while the PDESCs can be organized and maintained as a ring buffer.

In at least one embodiment, the PDESC ring or ring buffer can be implemented as an array or linked list where each PDESC entry in the ring buffer can have an associated sequence number or identifier. Unique monotonically increasing sequence numbers or identifiers can be assigned to PDESC entries as they are used to log operations, such as write operations. The sequence numbers can denote the time dependent ordering of the logged operations or requests. A PDESC that generally references a PB can be referred to as a PDESC-PB pair where the PB of the pair contains the content stored at the logical address included in the PDESC of the pair.

In at least one embodiment, the PB pool can be implemented using an array or linked list of PB entries. In one embodiment, a list of PBs can be denoted as a list of indices associated with the PBs. A bit vector can include a different bit for each PB, where the bit associated with a PB has a value of 1 when the PB is allocated and the bit associated with the PB otherwise has a value of 0 when the PB is unallocated or free. Once a PB is flushed, it can be reclaimed or released immediately by indicating that its associated index or bit in the bit vector denotes the state of unallocated or free (e.g., where the bit is set to 0). Thus, using the PB pool rather than a PB ring buffer has no dependencies, problems or constraints that can occur, for example, due to tail pointer management of the ring buffer. With a PB pool, each PB can be released or reclaimed immediately after the data of the PB has been flushed or destaged to a BE PD.

Before proceeding with further description and considerations of a request processing protocol in an embodiment in accordance with the techniques of the present disclosure, following is a discussion of additional details regarding use of a metadata (MD) structure of mapping information that can be used in at least one embodiment in accordance with the techniques of the present disclosure, sequence numbers or identifiers (IDs) that can be used in at least one embodiment in accordance with the techniques of the present disclosure, and additional information regarding use of PDESCs and PBs for recording operations in the log.

The mapping information can be used to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information can include a MD structure that is hierarchical structure of multiple layers.

Figure 7:
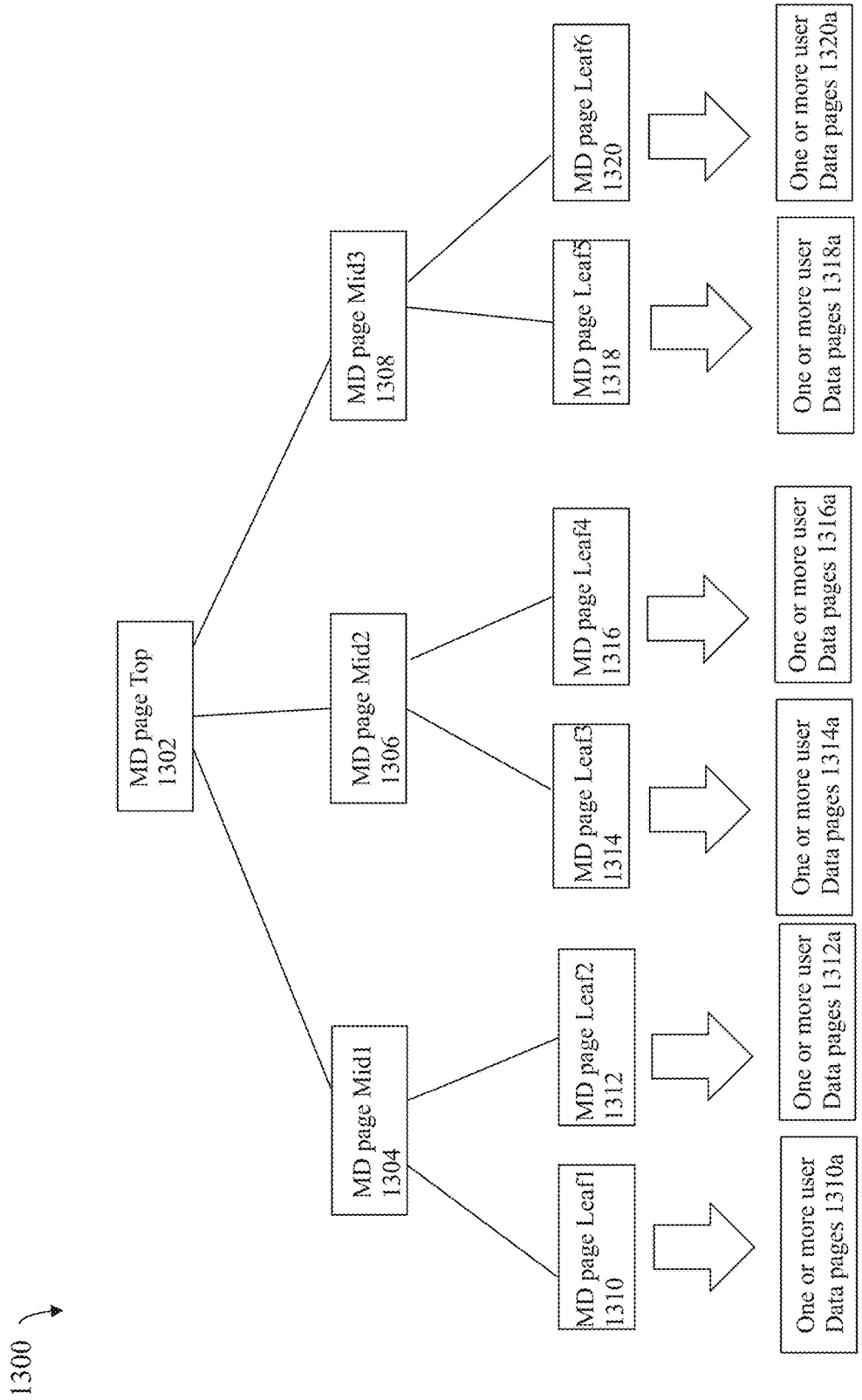
FIG. 7 is an example representation of mapping information of hierarchy of metadata pages that can be used in mapping logical addresses to physical storage locations in an embodiment in accordance with the techniques of the present disclosure.

In at least one embodiment, the mapping structure for a LUN, such as a LUN A, can be in the form of a tree having a plurality of levels. More generally, the mapping structure can y be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree can correspond to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure has up to a maximum of N child nodes. For simplicity of illustration, the tree structure of MD pages, corresponding to the mapping structure in at least one embodiment, is represented in FIG. 7 as including only 3 levels where each node in the tree can have at most 3 child nodes. Generally, the techniques of the present disclosure can be used with any layered or hierarchical structure of MD pages.

Referring to FIG. 7, shown is an example 1300 of a tree of MD pages that can be used in an embodiment in accordance with the techniques of the present disclosure. The example 1300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 1300, the top or root level, level 1, includes MD page 1302; the mid or middle level, level 2, includes MD pages 1304, 1306 and 1308; and the bottom level, level 3, includes MD pages 1310, 1312, 1314, 1316, 1318 and 1320, which are also be referred to as leaf nodes or MD leaves. As also illustrated in the example 1300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages

1310, 1312, 1314, 1316, 1318 and 1320 point or reference, respectively, one or more UD pages 1310*a*, 1312*a*, 1314*a*, 1316*a*, 1318*a* and 1320*a*.

The links or connections between a parent node (at level M) and its one or more child nodes (at level M+1) in the tree 1300 generally represent mappings between the parent node and the one or more child nodes. In at least one embodiment, the parent node can include a reference used to access (directly or indirectly) each of its one or more child nodes. For example, the root node MD page top 1302 can include addresses or pointers used to access each of its child nodes 1304, 1306 and 1308. The mid-level node MD page mid1 1304 can include addresses or pointers used to access each of its child leaf nodes 1310, 1312. The mid-level node MD page mid1 1306 can include addresses or pointers used to access each of its child leaf nodes 1314, 1316. The mid-level node MD page mid1 1308 can include addresses or pointers used to access each of its child leaf nodes 1318, 1320.

In at least one embodiment, each of the addresses or pointers included in a MD page that references a location in another MD page or references a location in a UD page can be a physical storage location on the back-end PDs. Thus, the traversal between connected nodes of the structure 1300 can correspond to traversing physical address or storage locations included in pages or nodes that are parent nodes.

In connection with accessing a particular UD page in at least one embodiment, all MD pages in a path from the root or top level of the tree to the UD page can be required to be traversed in a consecutive serialized order in which such pages appear in the path traversal down the path from the top or root level to the UD page accessed using a particular one of the MD page leaf nodes. For example, assume UD page or block X is included in the set of UD pages 1312*a*. In order to access UD page X of 1312*a*, the following denotes the consecutive serialized order in which the MD pages forming a sequence are accessed: MD page top 1302, MD page mid1 1304, and MD page leaf2 1312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 1302, MD page mid1 1304, and MD page leaf2 1312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 1300 can generally include multiple pointers or references to locations of its child nodes or pages. For example, MD page top 1302 includes pointers to locations of its child nodes, MD pages 1304, 1306 and 1308. MD page mid2 1306 includes pointers to locations of its child nodes, MD pages 1314 and 1316.

The data pages 1310*a*, 1312*a*, 1314*a*, 1316*a*, 1318*a* and 1320*a* include UD or content stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 7, the data pages 1310*a*, 1312*a*, 1314*a*, 1316*a*, 1318*a* and 1320 each include user data stored on particular logical addresses of the LUN A's logical address space. It may be, for example, that element 1310*a* includes user data stored at a first set of LBAs 0-511; and that element 1312*a* includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 1310*a* denotes data pages for LBAs 0-511; the element 1312*a* denotes data pages for the LBAs 512-1023; the element 1314*a* denotes data pages for LBAs 1024-1535; the element 1316*a* denotes data pages for LBAs 1536-2047, and so on.

In at least one embodiment, when the structure 1300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 1302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 1300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 1300 to determine the data block for a particular LUN and LBA. Similarly, it is a straightforward mathematical calculation to determine the index, offset or entry in a particular page or node to be accessed in connection with obtaining data blocks stored at the particular LUN and LBAs of the LUN. Each MD page in 1300 can be known to include MD relevant for accessing data on a particular LUN and one or more LBAs of that LUN. For example, consistent with discussion above, element 310*a* denotes the data blocks for LBAs 0-511 of a LUN. In order to access the data block for an LBA of the LUN in the LBA subrange 0-511, MD pages 1302, 1304 and 1310 can be traversed in sequential order. In particular, the first entry or offset of the MD page top 1302 can contain the address of the MD page mid 1 1304; the first entry or offset of the MD page mid 1 1304 can contain the address of the MD page leaf 1 1310; and the first entry or offset of the MD page leaf 1 1310 can contain the address of the data blocks for 1310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

In an embodiment in accordance with the techniques of the present disclosure for purposes of data integrity and correctness, the time order dependency of the logged data and operations of the log needs to be maintained. The time order is with respect to the relative order in which the operations are to be applied to the stored data of the data storage system to ensure data integrity and correctness. In an active-active system where I/Os can be serviced by both nodes of the dual node system, the time order dependency requirement needs to be maintained and synchronized across both nodes of the system. For example, at a first point in time, the node A can process a first write that is acknowledged to the host as completed. The first write can write first data to a first logical address, where the first write is stored in the log and subsequently flushed to the BE PDs. At a second point in time subsequent to the first point in time, the node A can process a second write that is acknowledged to the host as completed. The second write can write second data to the first logical address where the second write is also stored in the log and subsequently flushed to the BE PDs. When flushing the logged first data of the first write and the logged second data of the second write, the time order dependency or requirement is that the second data of the second write needs to be stored to the physical storage containing the data for the first logical address after the first data in order to ensure that the actual physical storage contains the correct data expected by the host based on the order in which the first and second writes were acknowledged to the host as being applied to the first logical address. Since the second write is acknowledged as successfully complete subsequent to the successful acknowledgement of the first write, the host expects the first logical address to contain the second data written (or overwritten) by the second subsequent write. In at least one system, the time order of logged data and operations can be denoted using global sequence numbers or IDs. Any optimizations performed such as, for example, in connection with parallel flushing must maintain the same resulting data content as described by the time order dependency denoting the logical ordering in which the logged requests or operations are applied.

In one such dual node system in accordance with the techniques of the present disclosure, one of the two nodes can be designated as the primary node which assigns each logged operation a new unique sequence ID. The sequence ID of the logged requests or operations denote the time dependent order in which such logged requests or operations are logically applied to the stored data on the BE PDs in order to maintain the data integrity and data content and expected by the host or other clients. The order in which the data is flushed from the log to the BE PDs maintains the time order requirement or dependency as denoted by the sequence IDs.

Thus, the designated primary node of the system node pair is designated as the primary node with respect to all write operations and other operations included in the log across all the LUNs configured from storage of the BE PDs accessible by the node pair. The primary node, for example, assigns a unique sequence ID to each write I/O operation having its write data stored in the log. In at least one embodiment, the primary node can assign all the sequence IDs independent of which node receives the write I/O or other operation having corresponding logged data that is subsequently flushed from the log. Thus, the primary node assigns sequence IDs for writes and other commands or operations that are logged, where such writes and other commands are received collectively by both the primary node and the non-primary node of the pair. The sequence IDs assigned establish the time order. In particular, the time order can be denoted by the monotonically increasing sequence IDs assigned to logged request or operation. To illustrate, assume a first sequence ID is assigned to a first write I/O that writes first data, a second sequence ID is assigned to a second write I/O that writes second data, and the first sequence ID is less than the second sequence ID. In this case, the first write I/O and first data occur in the time order sequence prior to the second write I/O and second data, where the first write I/O and the first data are written or applied prior to the second write I/O and the second data. In this manner, the sequence IDs assigned by the primary node are used to establish the time order dependency of all the write I/Os written to all the LUNs configured from storage of the BE PDs where the pair of nodes services all I/Os directed to such LUNs.

In one dual node system in at least one embodiment in accordance with the techniques of the present disclosure, the log can include page blocks or PBs and page descriptors or PDESCs as mentioned above. Each write I/O that writes data to a target logical address can have its associated write data stored in the log using a PB and a PDESC. The write data is stored in a PB and the PDESC references or points to the PB containing the write data. The PDESC can generally include other information regarding the write I/O such as, for example, the target logical address (e.g., LUN and LBA or offset), the sequence ID, a pointer (ptr) or reference to the PB including the write data associated with the PDESC, and other information such as flags associated with the logged operation or request.

In one such dual node system, the designated primary node that assigns sequence IDs can also be the node managing the page descriptors or PDESCs stored in the log. Thus the primary node can be the sole node of the pair that assigns sequence IDs of logged requests or operations received by both nodes. The primary node can also be the sole node that handles allocating PDESCs and freeing PDESCs on behalf of requests or operations received by both nodes. Thus, in an active-active configuration where both nodes of the pair can receive I/Os and other commands, all requests for new sequence IDs and new PDESC allocations of the log can be done only by the primary node even though the received I/Os or other commands may be received by the peer non-primary node. The primary node can assign monotonically increasing sequence IDs to new requests. In such a system, each node receiving the I/O or other command recorded in the log obtains an available PB from the log.

In at least one embodiment in accordance with the techniques of the present disclosure, a complete set of the PDESCs of the log can be stored in the local volatile memory of each node, where the complete set of PDESCs can be local memory resident and are not evicted from the local memory of each node. In contrast, at least some of the PBs of the log can be maintained in a portion of the node's local volatile memory used as a node-local cache that is subjected to eviction in accordance with local memory management of the node. In this manner, for a write operation that is received by a node, the data written by the write operation can be stored in a PB of the log. Additionally, the node receiving the write can store the write data in the node's volatile memory cache managed in accordance with the local memory management of the node's cache policy. Thus, the write data written by the write operation can be expected to be, or is likely to be, in the local volatile memory cache of the node that received the write operation.

In at least one embodiment in accordance with the techniques of the present disclosure, each of the nodes can also maintain its local volatile memory one or more flush working sets (FWSs) (also sometimes referred to herein simply as working sets). In at least one embodiment, the FWS can be a structure that organizes recorded or logged operations each represented by a PDESC-PB pair of the persistently stored log into logical groupings or containers of logged operations. In at least one embodiment, the FWS can be a hierarchical structure that includes containers of PDESCs. The PDESCs of a container can be, for example, a linked list of the PDESCs also stored in the volatile memory of each node. In at least one embodiment as discussed elsewhere herein, each container can be associated with a specified LBA subrange of consecutive LBAs of a particular LUN. In this manner, a container can include a linked list that connects together in the same container those PDESCs for logged writes that write data to an LBA in the specified LBA subrange of the container.

In at least one embodiment, multiple log records of the log associated with the same MD leaf can be included in the same container. As discussed elsewhere herein, each MD leaf can be associated with an LBA subrange of a LUN, where the MD leaf is included in the MD or mapping information used to map logical addresses in the LBA subrange to corresponding physical storage locations. Thus each container can be associated with an LBA subrange of one of the MD leaves, where the container includes the PDESCs of logged writes that write data to an LBA in the LBA subrange of the one MD leaf.

In at least one embodiment, a PDESC can be added to the FWS of a node as the node performs processing for the PDESC in accordance with the protocol and processing described below. In this manner, each node can maintain the PDESCs organized in an arrangement of containers of the FWS.

In at least one embodiment, the FWS of each node can be a hierarchical structure such as a tree, one or more hash tables, or other suitable structures that can vary with embodiment. Generally, the FWS can be characterized as a structure of containers that can also sometimes be referred to herein as leaf containers (LCs), where each LC can be associated with an LBA range of a different one of the MD leaf nodes of the mapping information. In at least one embodiment, each LC can be associated with one of the MD leaves, where the LC can include a linked list of the PDESCs of logged operations directed to an LBA associated with the MD leaf. In this manner, the FWS can generally represent the content of the log organized and sorted by LCs. In at least one embodiment, a PDESC for a logged write can be added to the FWS of a node during ingestion of the write.

In at least one embodiment, each of the two nodes can include a node local copy of the FWS in volatile memory of the node. In at least one embodiment, the FWS of each node can include no instances of LCs when the system starts up. In such an embodiment, each instance of an LC in the FWS of a node can be created or allocated dynamically in connection with servicing the initial (e.g., first in time) write to a particular LC. Each LC can be associated with a defined LBA range so that the initial write to the defined LBA range triggers the allocation or creation of the LC structure instance on each node's local FWS.

In some contexts herein, a particular node receiving a write or other operation can be referred to as an initiator node with respect to the particular write or other operation.

In connection with a node performing processing, such as in accordance with the protocol to commit or record a write operation, the write operation can write to a target logical address. The target logical address is included in a defined LBA range that is associated with one of the MD leaf nodes, and the defined LBA range is also associated with an LC including logged writes falling in the defined LBA range. For a node processing the first or the initial write to the defined LBA range associated with a MD leaf where the MD leaf is further associated with an LC, an instance of the LC in the node's local FWS can be created. Additional processing in connection with the protocol described below to synchronize the peer's FWS can also result in creating or allocating an instance of the LC in the peer node's FWS if such an instance of the LC having the defined range does not already exist in the peer node's FWS.

In at least one embodiment, each instance of an LC in the FWS of a node can be created or allocated dynamically as noted above. In such an embodiment, the LC can be implemented as a structure including counters (discussed in more detail elsewhere herein) and a linked list of PDESCs of recorded or logged operations, where the PDESCs of the LC's linked list can be the node's local copies of the PDESCs. When the LC is initially created or allocated, the particular items created or allocated can vary with the particular structure used to implement the LC. In at least one embodiment in which each LC is implemented as a structure including the counters and the linked list, the initial allocation or creation of the LC can include, for example, allocating the LC structure, initializing the counters of the LC structure to zero, allocating pointers and other items used to generally maintain the linked list of PDESCs (e.g., pointers used to maintain the linked list such as to add and remove PDESCs from the list, and the like).

Figure 8:
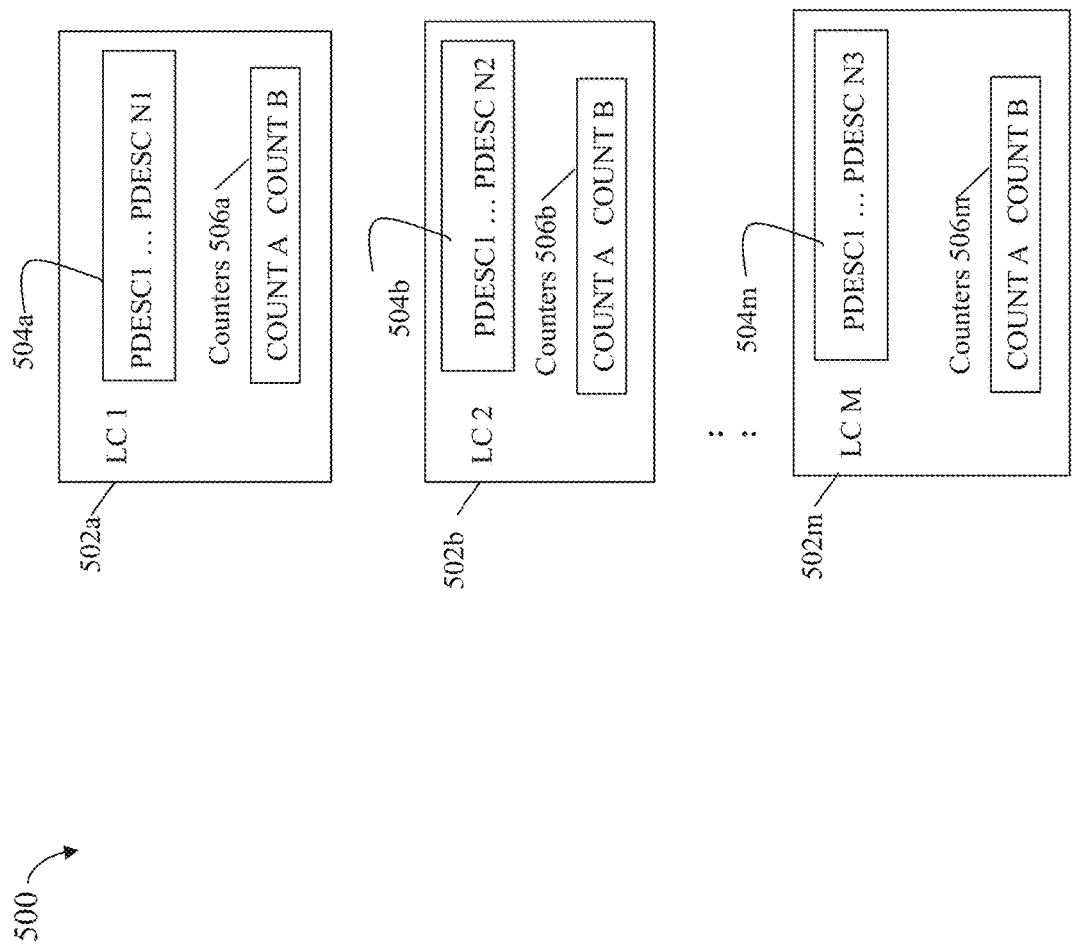
FIG. 8 is an example of containers of logged operations in an embodiment in accordance with the techniques of the present disclosure.

Referring to FIG. 8, shown is an example 500 illustrating LC instances of an FWS of a node in at least one embodiment in accordance the techniques of the present disclosure. Consistent with other discussion herein, the FWS 500 can generally be any suitable structure or arrangement used to organize the LCs of logged requests or operations of the log. The FWS can be, for example, a tree structure, one or more hash tables, or other hierarchical structure used to maintain the LCs in a sorted organization to facilitate lookup of a particular LC given a particular LBA. At a point in time P, the FWS of a node can include the PDESCs of the logged requests or operations currently stored in the log at the time P. As discussed elsewhere herein, each node can store its own local copy or instance of the FWS whereby the protocol discussed elsewhere herein provides for maintaining synchronized copies of the FWS on both nodes in a dual node system.

The example 500 illustrates an example of the FWS after the system has processed multiple writes that are recorded in the log, where each of the writes is recorded in the log using a PDESC-PB pair. The FWS 500 includes the LCs 502a-m. The LC 1 502a includes a linked list of PDESCs 504a and includes the counters 506a. The LC 2 502b includes a linked list of PDESCs 504b and the includes the counters 506b. The LC M 502m includes a linked list of PDESCs 504m and includes the counters 506m. Thus, the FWS can be characterized in one aspect as a structure comprising LCs, where the LCs include the PDESCs of the log. Each of the counters 506a-m can include multiple counter values, where each of the counter values corresponds to a different one of the nodes of the system. Thus, in a dual node appliance or system, each of the counters 506a-m can include two counters, COUNT A and COUNT B. For the LC1 502a including counters 506a, the COUNT A of 506a denotes a number of data blocks of logged writes for logged write I/Os of LC1 502a which are received and ingested or serviced by the node A; and the COUNT B of 506a denotes a number of data blocks of logged writes for logged write I/Os of LC1 502a which are received and ingested or serviced by the node B. In a similar manner, each of the remaining counters 506b-m, respectively, of the LCs 502b-m can include instances of COUNT A and COUNT B for the respective associated LC. For example, for the LC2 502b including counters 506b, the COUNT A of 506*b* denotes a number of data blocks of logged writes for logged write I/Os of LC2 502*b* which are received and ingested or served by the node A; and the COUNT B of 506*b* denotes a number of data blocks of logged writes for logged write I/Os of LC2 502*b* which are received and ingested or serviced by the node B.

In at least one embodiment, each node can include a local volatile memory copy of the PDESCs of the log, where the FWS can further include the LCs 502*a-m* that are linked lists formed using the PDESCs stored in the node's local copy. Thus the LCs of the FWS can denote a particular logical organization or grouping of the PDESCs of logged operations based on the target logical address LUN and LBA of the logged operations described by the PDESCs. Each of the LCs 502*a-m* has an associated LBA range of a particular LUN, and each PDESC of a logged operation is included a particular one of the LC's, where the PDESC's target logical address falls in the associated LBA range of the particular one LC. In this example, each LC of the FWS can be implemented as a structure including a linked list of PDESCs. More generally any suitable structure can be used for each of the LCs.

At the start, boot, or initialization of system, there may be no logged writes so the FWS includes no LCs and no PDESCs of logged writes. Each LC instance of an FWS can be created in response to processing the initial operation, such as the initial write, that is mapped to the LC instance. For example the initial write can be directed to an LBA that falls into the LBA range of the LC instance 502*a* whereby the LC instance 502*a* is created in response to the initial write, and the log record of the initial write is included on the linked list 504*a* of the LC instance 502*a*. Subsequent writes or requests that are mapped to the same LC instance 502*a* are placed on the linked list 504*a*. In a dual node appliance including the nodes A and B, if the logged write having an associated PDESC in the LC 502*a* is received by the node A, then the COUNT A of 506*a* is incremented by 1. Otherwise, the logged write having an associated PDESC in the LC 502*a* is received by the node B, where the COUNT B of 506*a* is incremented by 1. In this manner, either COUNT A or COUNT B of 506*a* is increment each time a logged write is added to the LC 502*a*. In a similar manner, each of the COUNT A and COUNT B of the counters 504*b-m* respectively of the LCs 502*b-m* can be updated and maintained.

To further illustrate, assume that there is an empty log and thus there are no LCs and no PDESCs in the log or the FWS. At a first point in time P1, assume the data storage system receives a first write that writes first data to a first logical address at LUN A, LBA 0. Assume each of the LCs 502*a-m* has an associated LBA range of 512 corresponding to the size of the LBA range associated with each MD leaf in at least one embodiment in accordance with the techniques of the present disclosure. However, at the time P1, none of the LCs 502*a-m* have been created and are not yet included in the FWS of the node A and not included in the FWS of the node B. In response to receiving the first write and performing processing of the protocol described in more detail elsewhere herein, each of the nodes A and B can create their own node-local instance of the LC1 502*a* having an associated LBA range of 0-511 for the LUN A, and can associate the logged record of the first write with the LC 502*a*. The first write can be recorded in the log using a first PDESC-PB pair of the log, where each node's local copy of the PDESC of the first pair can be included on the linked list 504*a* of PDESCs having associated LBAs that fall in the LBA range 0-511.

At a second point in time P2 subsequent to P1, a second write is received by the data storage system, where the second write writes second data to the logical address LUN A, LBA 100. The second write can be recorded in the log using a second PDESC-PB pair of the log, where each node's local copy of the PDESC of the second pair can be included on the linked list 504*a* of PDESCs having associated LBAs that fall in the LBA range 0-511.

At a third point in time P3 subsequent to P2, a third write is received by the data storage system, where the third write writes third data to the logical address LUN A, LBA 1000. The third write can be recorded in the log using a third PDESC-PB pair of the log. The PDESC of the third pair is directed to the LBA 1000 that falls into the LBA range of 512-1023 associated with the second LC 502*b*. Each of the nodes A and B can determine that the second LC 502*b* does not yet exist in the FWS of each of the nodes A and B. As such, the node A can create a node-local instance of the LC 502*b* having the associated LBA range of 512-1023, and include the LC 502*b* in its node local FWS. The node B can create a node-local instance of the LC 502*b* having the associated LBA range of 512-1023, and include the LC 502*b* in its node local FWS. Additionally, each node can create a local copy of the PDESC of the third pair that is included on the linked list 504*b* of PDESCs having associated LBAs that fall in the LBA range 512-1023 of the LC 502*b*.

As discussed elsewhere herein with a protocol used to process received operations or requests, such as write operations received by the nodes, each of the nodes can include a local copy of the FWS where the local copies of the two nodes can be synchronized as each received write operation is processed using the protocol.

In at least one embodiment, the FWS of a node can be shared and used by flush worker threads or processes of the node. In at least one embodiment, both of the nodes in a dual node system can independently perform processing to flush the log when log flushing has been triggered. In connection with flushing the log, data is destaged from the log to the non-volatile BE PDs and the log space can be reclaimed for reuse.

When flushing, each of the nodes can execute one or more code entities, such as flush worker threads or processes, that operate independently. In at least one embodiment, flush worker threads executing on a node can use the node's local FWS and detach LCs from the node's local FWS for flushing. Since the FWS is a structure that can be shared among multiple flush worker threads or processes on the same node, any suitable synchronization technique can be used to synchronize access to the FWS among such threads or processes executing on the same node. As discussed in more detail below, flush worker threads of a node, such as node A, can detach LCs of the FWS stored locally on the node A. The LCs detached for flushing by the flush worker threads of a node can be based on the concept of ownership assigned to the individual LCs. Consistent with other discussion herein, the LCs detached for flushing by the flush worker threads of the node A can only be those LCs having the node A designated as the LC owner. The LCs can be viewed as detachable units or containers of PDESCs of the log to be flushed. Thus, a thread or process of a node, such as the node A, performing flushing can detach LCs owned by the node A from the FWS of the node A until a sufficient number of LCs have been detached to fill a buffer of a particular size to be destaged from the log to the BE PDs. The buffer can include the PBs of the user data or content stored by the logged write operations. The mapping information or MD (e.g., FIG. 7) used to map logical address to physical storage locations can also be accordingly updated as the logged writes are flushed from the log to the BE PDs. Additionally, as the LCs of the PDESCs or the logged writes are flushed from the log, the FWS and the log can be accordingly updated. Log space (e.g., the PDESCs and PBs of the log) associated with the flushed records can be reclaimed for reuse.

In at least one embodiment, each logged write operation can be represented by a PDESC-PB pair of the log. Each LC can be associated with an LBA range of one of the LUNs storing user data. Storing the PDESC-PB pair in the log as part of the protocol described in more detail below can include storing the PDESC of the pair in a particular LC of the FWS structure on each of the nodes, where the PDESC-PB pair logs a write to a target logical address expressed using a target LUN and target LBA, and where the particular LC is associated with an LBA range including the target LBA for the target LUN. The particular LC in the FWS can be determined in any suitable manner. In at least one embodiment, the LBA range of a single LC can also be associated with a MD leaf. In this manner, the PDESCs of the same LC denote writes to the same LBA range associated with the same MD leaf. For example, in at least one embodiment, an LC associated with a particular MD leaf can be determined using a deterministic mathematical function that maps each PDESC-PB pair to an LC, where the PDESC-PB pair can write to a target LBA or offset of a target logical address and the LC has an associated LBA range including the target LBA.

In at least one embodiment in accordance with the techniques herein, ownership of each LC can be determined using the counters, COUNT A and COUNT B, of this LC. If COUNT A>COUNT B, then node A is assigned as the flush owner of the LC. If COUNT B>COUNT A, then node B is assigned as the flush owner of the LC. If COUNT A=COUNT B, an alternative technique as described elsewhere herein can be used to determine the flush owner of the LC. In at least one embodiment, responsive to an initiator node receiving a write I/O, the initiator node can cache the write data payload of the write I/O in the initiator node's local cache. However, the peer node which does not receive the write I/O may not similarly cache the write data payload of the write I/O. In this manner, the COUNT A for an LC denotes the number of logged data blocks of the LC that can be expected to be in the cache of the node A, and the COUNT B for an LC denotes the number of logged data blocks of the LC that can be expected to be in the cache of the node B. It can be desirable to select as the flush container or LC owner one of the nodes A or B having the highest associated counter of COUNT A or COUNT B. In this manner, the flush owner of the LC can be expected to have a larger number of cache hits with respect to the PBs or logged data blocks of the LC than its peer node with the lower associated counter.

The protocol described in the following paragraphs assigns a new ownership attribute to each LC where the ownership indicates whether the node A or node B owns the LC. The node designated as the owner of an LC flushes the LC. In this manner, the flush worker threads executing on the cores or processors of the node A only flush LCs having an owner attribute of node A, and the flush worker threads executing on the cores or processors of the node B only flush the LCs having an ownership attribute of the node B.

Figure 9:
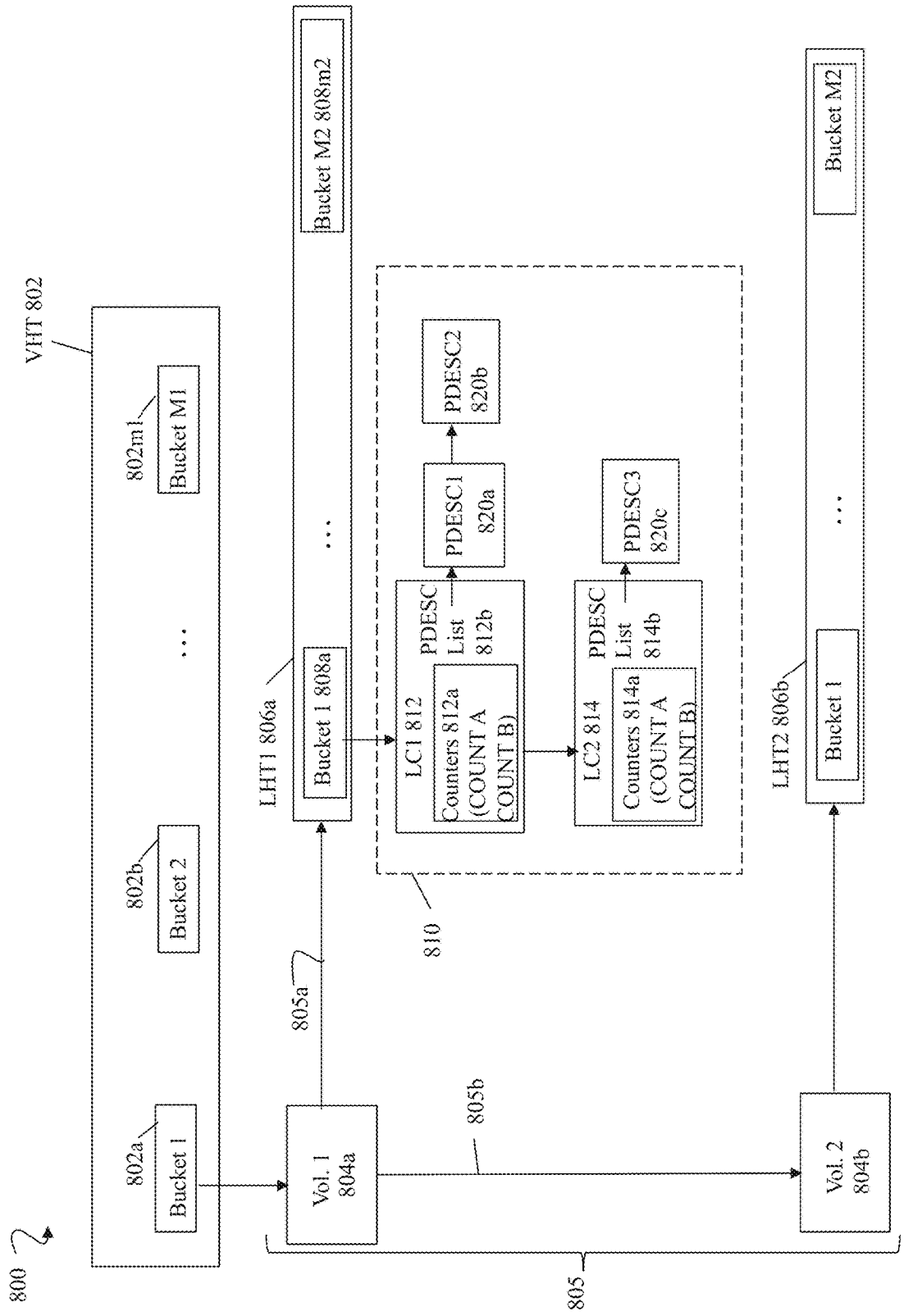
FIG. 9 is an example illustrating further detail regarding structures of a flush working set (FWS) in at least one embodiment in accordance with the techniques of the present disclosure.

Referring to FIG. 9, shown is an example 800 of further detail regarding an FWS structure in at least one embodiment in accordance with the techniques of the present disclosure.

The example 800 illustrates further details of the FWS structure stored in the volatile memory of each node of the system. The FWS 800 is a hierarchical 3 level structure including a volume hash table (VHT) 802 used to manage volumes or LUNs in the system, leaf hash tables (LHTs) 806a, 806b used to manage the leaf containers (LCs). Consistent with other discussion herein, each of the LCs corresponds to an associated LBA range or subrange of a LUN's LBA range. The LC includes a list of PDESCs of logged writes with target logical addresses that are included in the associated LBA range of the LC. In at least one embodiment, each LC can have an associated contiguous LBA range corresponding to that of a single MD leaf (e.g., 1310 of the example 1300 of FIG. 7).

The VHT 802 is a hash table of buckets 802a-m1, where each of the VHT buckets includes a list of LUNs or volumes having associated volume or LUN IDs (identifiers) that hash to a particular bucket. Generally, a write I/O writes data to a target logical address expressed as using a volume or LUN ID and an LBA or offset on the volume or LUN. The volume or LUN ID can be used to index into the VHT where the volume or LUN ID is mapped to one of the VHT buckets 802a-m1. For example, the LUN or volume ID=1 can be mapped, such as using a hash function, to the VHT bucket 1 802a (e.g., hash (LUN or volume ID)=VHT bucket index). The volume 1 (Vol. 1) has a corresponding entry 804a on the list of volume structures of the VHT buckets 802a. As another example, the LUN or volume ID=2 can be mapped, such as using a hash function, to the VHT bucket 1 802a. The volume 2 (Vol. 2) has a corresponding entry 804b on the list of volume structures of the VHT buckets 802a.

The elements 804a-b can denote volume structures which can be implemented as a data structure including any number of fields of information that can vary with embodiment. For example, each of the volume structures 804a-n can include a pointer to an LHT for the particular volume or LUN, the LUN or volume ID of the represented volume or LUN, a pointer to the next volume structure in the VHT bucket list, and the like. For example, the volume structure 804a includes a pointer (805a) to the LHT 806a, and a pointer (805b) to the next volume structure 804b in the volume structure list of the VHT bucket 802a.

In at least one embodiment, each volume structure 804 can have an associated LHT used to manage PDESCs of logged writes to the various LUNs or volumes. The LHT 806a includes buckets 808a-m2, where the LBA or offset, such as of the target logical address of the write I/O, can be used to index into the LHT. The LBA for a LUN or volume can be mapped, such as using a hash function, to a particular one of the LHT buckets 808a-m2 (e.g., hash (LUN LBA) =LHT bucket index).

In at least one embodiment, each of the LHT buckets 808a-m2 can be associated with a corresponding contiguous portion of the LBA range of the LUN or volume ID=1 (as represented using the volume structure 804a). Each LC of a particular LHT bucket can further include a contiguous LBA subrange falling within the LBA range of the associated LHT bucket. For a logged write to a target logical address, such as LUN 1, LBA 100, the LUN or volume ID of "1" can be hashed where the resulting hash value identifies the VHT bucket 1 802a. The linked list of volume structures 805 of the VHT bucket 802a can be sorted by LUN or volume ID and searched to locate the volume structure 804a for the LUN ID=1. The pointer 805c from the volume structure 804a references the LHT 806a for the LUN ID=1. The LBA=100 of the write I/O's target logical address can be hashed where the resulting hash value identifies the LHT bucket 806*a*. Each of the LHT buckets, such as 806*a*, can have an associated list of LCs, such as 810. For example, the element 810 includes the list of LCs associated with the LHT bucket 808*a*. The LCs of the 810 can be sorted by increasing LBA range corresponding to each of the LCs. The LBA of the target logical address can be mapped to a particular LC of the LHT bucket 808*a* where the logged write to the target logical address can be included on the list of logged writes of the particular LC. For example, the LHT bucket 808*a* can be associated with an LBA range from 0-1023 for LUN 1, where the LC 812 can have an associated LBA range of 0-511, and the LC 814 can have an associated LBA range of 512-1023. A logged write to the target logical address LUN 1, LBA 100 can be mapped to the VHT bucket 802*a*, the volume structure 804*a*, the LHT bucket 808*a*, and the LC 1 812. The logged write can be represented by an in-memory copy of the PDESC of the logged write. In other words, the log can persistently store a PDESC-PB pair for the logged write. Additionally, each node can store in its node-local memory a copy of the PDESC information on a list associated with a corresponding LC. For example, the PDESC 820*a* can describe the logged write to the target logical address LUN 1, LBA 100. In at least one embodiment, the PDESC of the FWS can reference or point to the persistently stored PB of the log as discussed elsewhere herein. Additionally, if the logged write denotes a write I/O that was received or ingested by a particular one of the nodes, a copy of the PB containing the write data can also be stored in the node's local cache, and the PDESC of the FWS on the node that ingested the write I/O can also point to or reference the node's cached copy of the PB. In at least one embodiment, if the logged write denotes a write I/O that was not received or ingested by a particular one of the nodes, the PB containing the write data is not cached in the node's local cache. Thus in at least one embodiment, the single one of the nodes A and B that ingests or receives a write I/O can cache a copy of the PB storing the write data in its node-local cache, and also have the logged write's PDESC of the FWS on the node reference or point to the node's cached copy of the PB. Additionally in such an embodiment, for the peer node that did not receive the write I/O, the logged write's PDESC of the FWS on the peer node references or points to the persistently stored PB of the log but does not reference or point to a cached copy of the PB.

In at least one embodiment, each of the LC structures 812-814 can include a pointer to the list of node local in-memory PDESCs of logged writes which write to a target logical address included in the contiguous LBA range associated with the LC, and can include a set of counters discussed elsewhere herein in more detail. For example, the LC 812 includes a pointer 812*b* to the first element (820*a*) in the PDESC list of logged writes to target logical addresses included in the LBA range associated with LC 812. The LC 812 also includes the counters 812*a* comprising COUNT A and COUNT B respectively denoting the number of logged writes of the PDESC list 812*b* ingested or received by the nodes A and B. For example, the LC 814 includes a pointer 814*b* to the first element (820*c*) in the PDESC list of logged writes to target logical addresses included in the LBA range associated with LC 814. The LC 814 also includes the counters 814*a* comprising COUNT A and COUNT B respectively denoting the number of logged writes of the PDESC list 814*b* ingested or received by the nodes A and B.

Thus, each LC having an associated contiguous LBA range further has an associated list of PDESC-PB pairs representing logged writes which write to target logical address in the contiguous LBA range of the LC. The LCs of 810 of the LHT bucket 808*a* can be stored by increasing LBA range. The PDESCs of the list of teach LC, such as the PDESC list 812*b* of the LC 812, can be a time ordered list of logged writes based on the time when the logged write is received by the data storage system.

For simplicity of illustration, the example 800 shows a list of volume structures for only the VHT bucket 802*a*, and only a list of LCs for LHT bucket 808*a*. More generally, each of the VHT buckets 802*b-m*1 can similarly include lists of volume structures, and each of the LHT buckets can similarly include a list of LCs.

Figure 10:
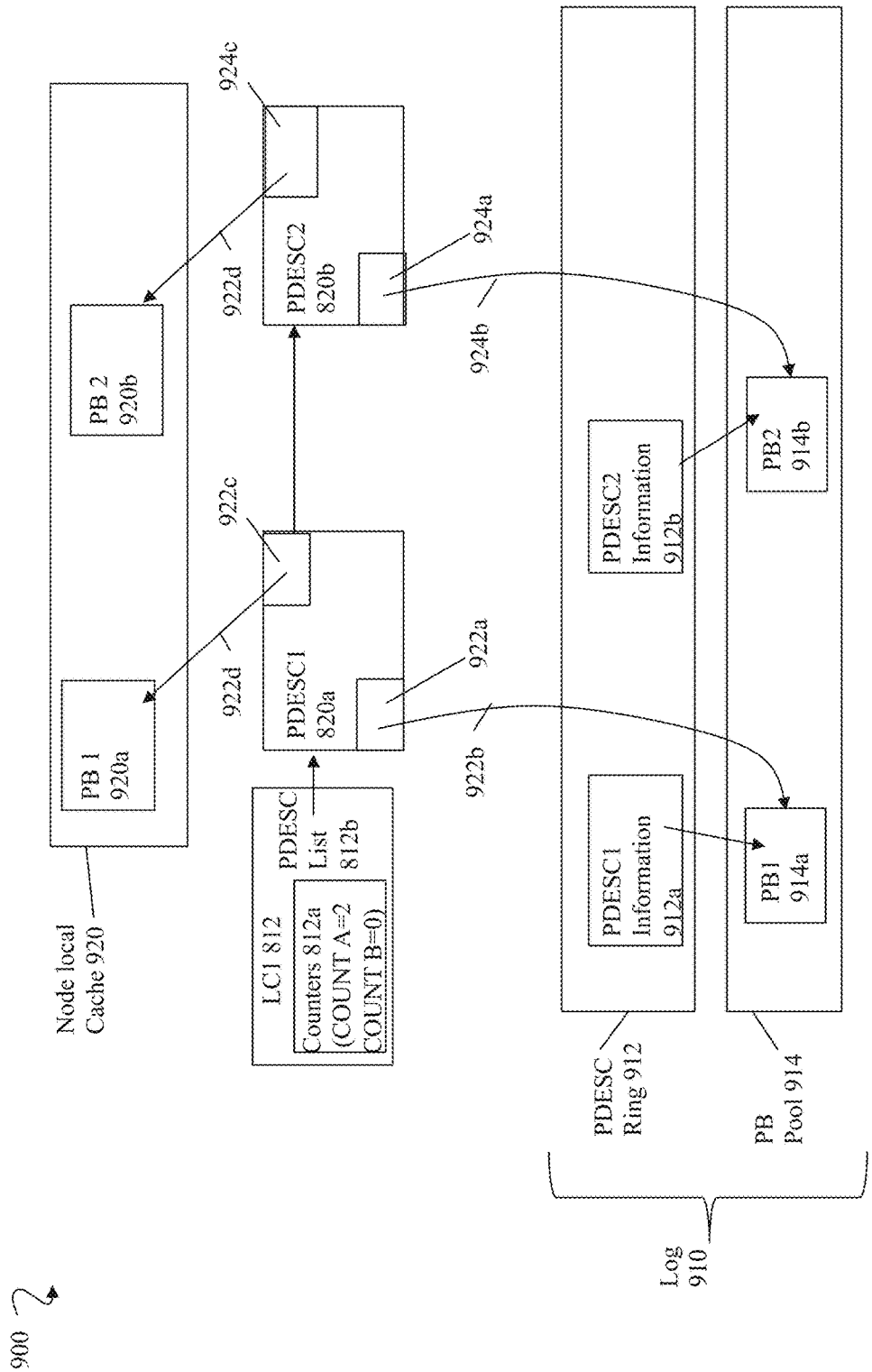
FIGS. 10 and 11 illustrate an example of content of structures of the nodes performing processing in at least one embodiment in accordance with the techniques of the present disclosure.

Referring to FIG. 10, shown is an example 900 illustrating in more detail the various structures in at least one embodiment in accordance with the techniques of the present disclosure. The example 900 includes the LC 812 and associated list of PDESCs 820*a-b* as in the example 800 of FIG. 9.

Additionally, the example 900 includes the node local cache 920 and the log 910. The log 910 can be the persistent non-volatile storage used for logging such as logging the write I/Os. The log 910 includes the PDESC ring 912 of persistently stored PDESCs, and the PB pool 914 of persistently stored PBs. The elements 812, 820*a* and 820*b* are stored in each node's local volatile memory as part of the FWS stored in the node's local volatile memory. Additionally, the element 920 denotes the node's local cache. For illustration, assume that the structures of 900 are associated with node A and that the system includes two nodes, A and B, as discussed elsewhere herein, in an active-active configuration where both the nodes A and B can receive and processing I/O operations. Assume that the node A (rather than the node B receives a first write I/O logged as a write I/O using the PDESC-PB pair 912*a*-914*a*, and the node A also receives a second write I/O logged as a write I/O using the PDESC-PB pair 912*b*-914*b*. The element 820*a* corresponds to the node A's in-memory node local copy of the PDESC for the first write I/O, where the PDESC 820*a* include the field 922*a* that references or points to (922*b*) the persistently stored PB 914*a* of the log 910. Additionally, since the node A (rather than the node B) ingests or receives the first write I/O, a copy of the write data as stored in the logged PB 914*a* is also stored as PB1 920*a* in the node A's local cache 920. The PDESC 820*a* can include the field 922*c* which references or points to (922*d*) the cached copy PB 920*a* of the write data written by the first logged write I/O.

The element 820*b* corresponds to the node A's in-memory node local copy of the PDESC for the second write I/O where the PDESC 820*b* includes the field 924*a* that references or points to (924*b*) the persistently stored PB 914*b* of the log 910. Additionally, since the node A, rather than the node B, ingests or receives the second write I/O, a copy of the write data as persistently stored in the logged PB 914*b* is stored as the PB2 920*b* in the node A's local cache 920. The PDESC 820*b* can include the field 924*c* which references or points (922*d*) to the cached copy PB 920*b* of the write data written by the second logged write I/O.

The COUNT A of 812*a* has a value of 2 denoting that node A has received or ingested the 2 logged write I/Os of the LC 812 (where the logged write I/Os are the above-noted first and second write I/Os having associated PDESCs 820*a-b* on the PDESC list 812*b*); and the COUNT B 812*b* has a value of 0 denoting that the node B has received or ingested 0 of the logged write I/Os of the LC 812.

Figure 11:
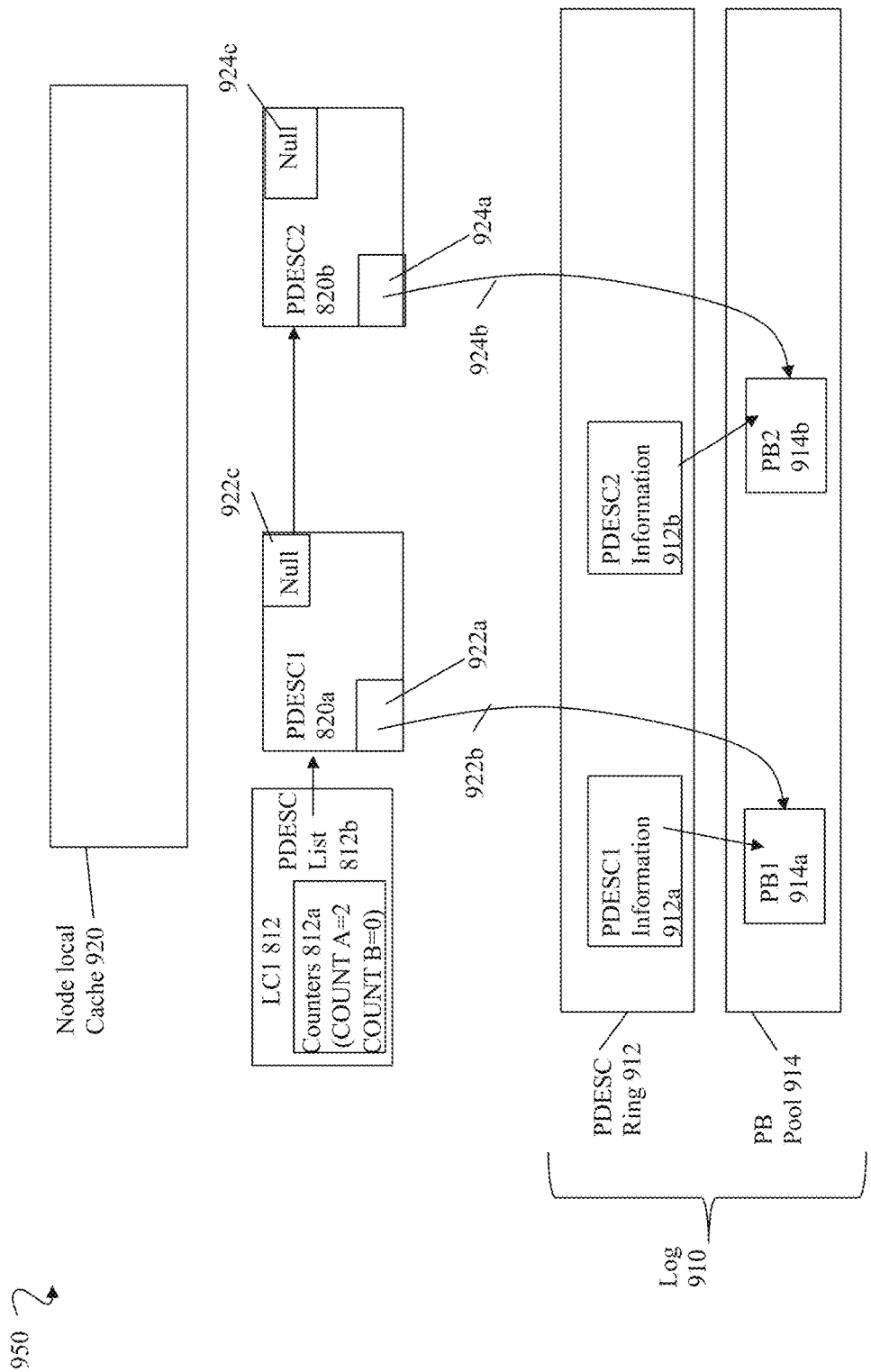

Continuing with the above example of 900, reference is made to FIG. 11, shown illustrating in more detail the various structures of the node B which does not ingest or receive either of the above-noted first and second write I/O operations. The example 950 illustrates the various structures as stored on node B in connection with the example 900 (which illustrates the various structures as stored on node A). The structures of the example 950 differ from those of the example 900 in that the node B (as illustrated in 950) does not cache the write data PB2 914b in its node local cache 920, and also does not cache the write data PB 914a in its node local cache 920. Thus, the node B's PDESC 820b has field 922c as null, and has field 924c as null.

The FWS can have an associated state and can transition between multiple defined states at various points in time. In at least one embodiment, possible FWS states can include frozen, active and idle or empty. An FWS can have the active state when the FWS can be updated to log new operations, such as new writes, and thus add new PDESCs to appropriate LCs and associated PDESC lists of the LCs. From the active state, the FWS can transition to the frozen state. An FWS can have the frozen state when updates to the FWS are not allowed. In the frozen state, updates to the FWS are not allowed in that the FWS is not updated to add new logged writes. Once an FWS is frozen, the logged writes of the FWS (e.g., as represented by the PDESCs on the PDESC lists of the LCs of the frozen FWS) can be flushed from the log and destaged to the BE PDs. Consistent with other discussion herein, as logged writes of a frozen FWS are flushed log storage as well as volatile memory of the FWS instance can be deallocated or reclaimed for reuse. In at least one embodiment with reference back to the example 800 of FIG. 9, the memory of instances of 810 of the LCs and lists of PDESCs represented the logged writes can be reclaimed or deallocated and thus made available for reuse as logged writes of the LCs are flushed. In at least one embodiment, once all logged writes of LCs of the frozen FWS are flushed, the FWS can transition from the frozen state to the idle or empty state. The idle or empty state denotes an FWS instance that does not include any logged writes and is currently inactive (e.g., new logged writes are not being added to the FWS instances. From the idle or empty state, the FWS can transition to the active state to be used to store PDESCs in logged writes. When in the idle or empty state, the FWS can have no LCs and no in-memory PDESC list of the LC. When the FWS is in the active state, an LC structure instance can be allocated and initialized responsive to the first or initial logged write of the LC, where an in-memory PDESC for the logged write is also added to the list of PDESCs of the LC.

Figure 12:
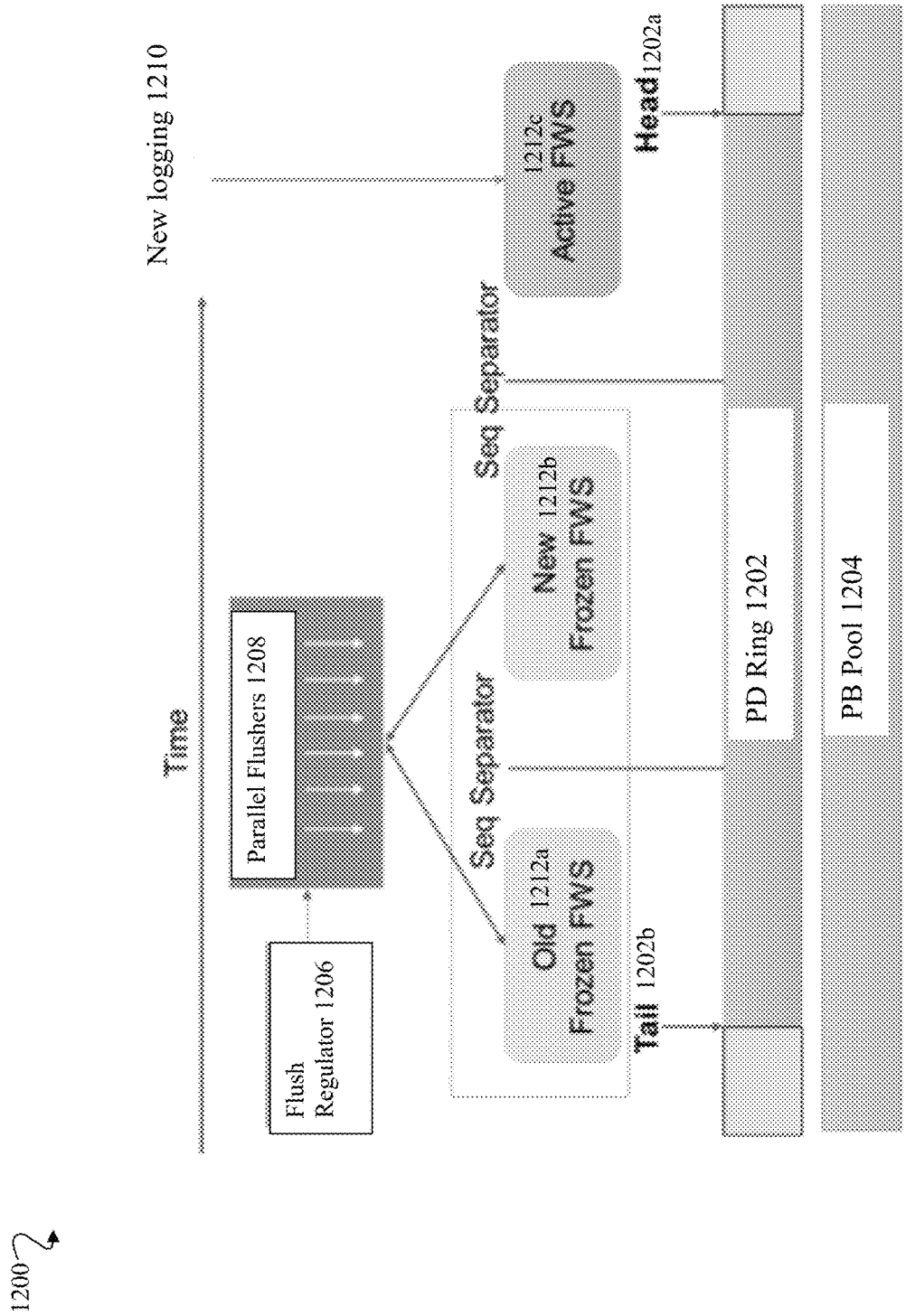
FIGS. 12 and 13 are examples illustrating structures and data flow in connection with flushing in at least one embodiment in accordance with the techniques of the present disclosure.

Referring to FIG. 12, shown is an example 1200 illustrating components and structures of a node that can be used in connection with flushing performed by each node in at least one embodiment in accordance with the techniques of the present disclosure.

The flush regulator 1206 can regulate or control various aspects of the flushing performed by the node. In at least one embodiment, the flush regulator 1206 can, for example, vary the number of flusher threads or flushers that operate and/or execute in parallel (1208) at a point in time such as to vary the rate at which flushing of an FWS can be performed.

The elements 1212a-c denote the 3 FWS's of unflushed pages or blocks of data that can be included in each node's volatile memory. At any point in time, at most one FWS can be active on a node where newly logged operations (1210), such as new writes, are added to the active FWS 1212c. Parallel flushers 1208 of both nodes can flush the unflushed logged entries of the two frozen FWSs 1212a-b to the BE PDs until each such frozen FWS becomes empty (e.g., all unflushed logged entries are flushed from the FWS whereby the FWS transitions to empty). In at least one embodiment, memory used for LCs and associated PDESCs of an empty FWS can be reclaimed or deallocated and thus made available for reuse. Upon the occurrence of one or more conditions occurring, such as responsive to the active FWS 1212c becoming full, the active FWS can transition to the state of frozen, and an empty FWS can transition to the active state thereby becoming the new active FWS.

In this manner, corresponding FWSs on both nodes A and B can be frozen so that A and B have a consistent view of the VHT, LHTSs, LCs and associated PDESC lists (of logged writes) on both nodes A and B. With reference back to the FIG. 9, the example 800 can represent an instance of a first frozen FWS on the node A having a corresponding instance of a second frozen FWS on node B. The foregoing two frozen FWS's on the nodes A and B can be corresponding in that they provide consistent views of the VHT, LHTSs, LCs and associated PDESC lists (of logged writes) on both nodes A and B.

As illustrated in connection with the example of FIGS. 10 and 11, the nodes A and B have consistent FWS views with respect to logged writes of the LC 812, where the logged writes are represented by the PDESCs 820a-b. The nodes A and B in connection with the FIGS. 10 and 11 can differ with respect to the PBs stored in the local caches 920 of the nodes A and B.

In at least one embodiment in accordance with the techniques of the present disclosure, for frozen corresponding FWSs on nodes A and B, each of the nodes A and B can use the counters, such as 812a, of each LC, such as LC 812, to assign or determine which of the nodes A or B is the flush owner of the LC. Only one of the nodes A or B is assigned as the owner or flush owner of the LC, where the flush owner is the node that flushes the logged writes of the LC.

In at least one embodiment in accordance with the techniques of the present disclosure, ownership of each LC can be independently determined by each of the nodes A and B using the counters, COUNT A and COUNT B, of the LC. If COUNT A>COUNT B, then node A is assigned as the flush owner of the LC. If COUNT B>COUNT A, then node B is assigned as the flush owner of the LC. If COUNT A=COUNT B, an alternative technique as described elsewhere herein can be used to determine the flush owner of the LC. In at least one embodiment, responsive to an initiator node receiving a write I/O, the initiator node can cache the write data payload of the write I/O in the initiator node's local cache. However, the peer node which does not receive the write I/O may not similar cache the write data payload of the write I/O. In this manner, the COUNT A for an LC denotes the number of logged write data blocks of the LC that can be expected to be in the cache of the node A, and the COUNT B for an LC denotes the number of logged write data blocks of the LC that can be expected to be in the cache of the node B. It can be desirable to select as the flush container or LC owner one of the nodes A or B having the highest associated counter of COUNT A or COUNT B. In this manner, the flush owner of the LC can be expected to have a larger number of cache hits with respect to the PBs or logged data blocks of the LC than its peer node with the lower associated counter.

Since both the nodes A and B have consistent FWS copies, each of the nodes A and B can perform the same processing as noted above and generally described herein to determine the flush owner of each LC of the FWS. Flusher threads of each of the nodes A and B can progress independently at different rates where each node only flushes those LCs which it determines it owns. LC ownership is dynamic and varies with which node receives or ingests the most logged writes of the LC. Additional internode synchronization and coordination is not required to determine LC ownership using the techniques of the present disclosure.

Figure 13:
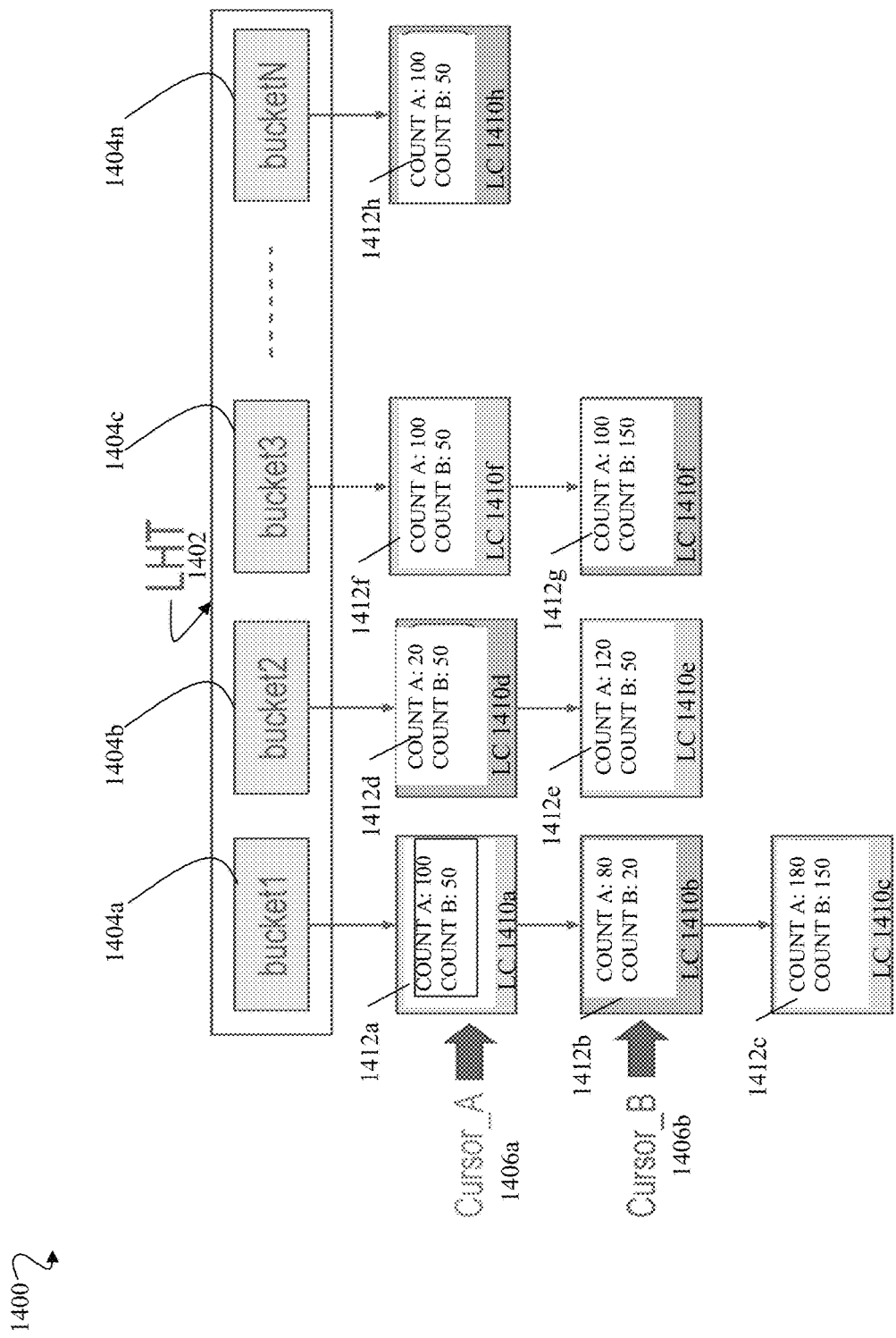

Referring to FIG. 13, shown is an example 1400 illustrating flushing in at least one embodiment in accordance with the techniques of the present disclosure.

The example 1400 illustrates an LHT as may be included in a node local FWS on each of the nodes A and B. Associated with each node's local FWS copy, the node can maintain a cursor denoting the next LC or container to be evaluated as a candidate for flushing by the node. Each node can evaluate LCs by advancing its cursor from left to right among the buckets 1404a-1404n in an LHT, and, within each of the buckets 1404a-n, from top to the bottom for all LCs in each bucket. Thus, for example, each node may evaluate LCs in sequential order as follows: bucket 1404a, LCs 1412a-c; bucket 1404b, LCs 1412d-e; bucket 1404c, LCs 1412f-g; . . . bucket 1404n, LC 1412h. The flush ownership, or node owning an LC and thereby the node that flushes the LC, can be determined using the counters 1412a-h of the LCs 1412a-h as described elsewhere herein (e.g., by performing the processing of the flowchart 1100 of FIG. 17).

Each of the nodes A and B include its own node local copy of the structures of the example 1400 where, on node A, the element 1406a is maintained as the cursor for node A marking the next LC to be evaluated by the node A, and where the element 1406b is maintained as the cursor for node B marking the next LC to be evaluated by the node B. Thus as illustrated in the example 1400, node A and node B can be evaluating different LCs for ownership at the same point in time.

Consistent with other discussion herein in at least one embodiment of a dual node system, first and second counters can be maintained for each LC to track the number of data blocks or pages ingested or received, respectively, by each of the nodes A and B. The counters can be updated in the I/O processing, and in particular, in commit flow when committing the write operation to the log. Depending on which node is the initiator node of a write operation, an appropriate one of the counters of an LC can be updated, and additionally, the data block written by the write operation can be associated with the LC. For a particular data block or page written by a logged write operation, the data block or page is added to the same LC on both nodes A and B. After the FWS is frozen on both nodes, both nodes will see the same or consistent values of the counters of the same LC. During flushing, each node can independently determine flush ownership of each LC by comparing the counters of the LC. Based on the counters of the LC, if a first of the nodes has received or ingested more written data blocks than the other peer node, then the first node can be assigned as the flush owner of the LC. If the counters of the LC are the same, then flush ownership of the LC can be determined using an alternative technique, an example of which is discussed in more detail elsewhere herein.

In at least one embodiment, independent of whether the I/O initiator is the primary node or the secondary node, processing can be performed as part of the commit flow protocol to always add the data block, or more generally, the logged write, to the LC on the primary node prior to adding the logged write to the corresponding LC on the secondary node.

Figure 14:
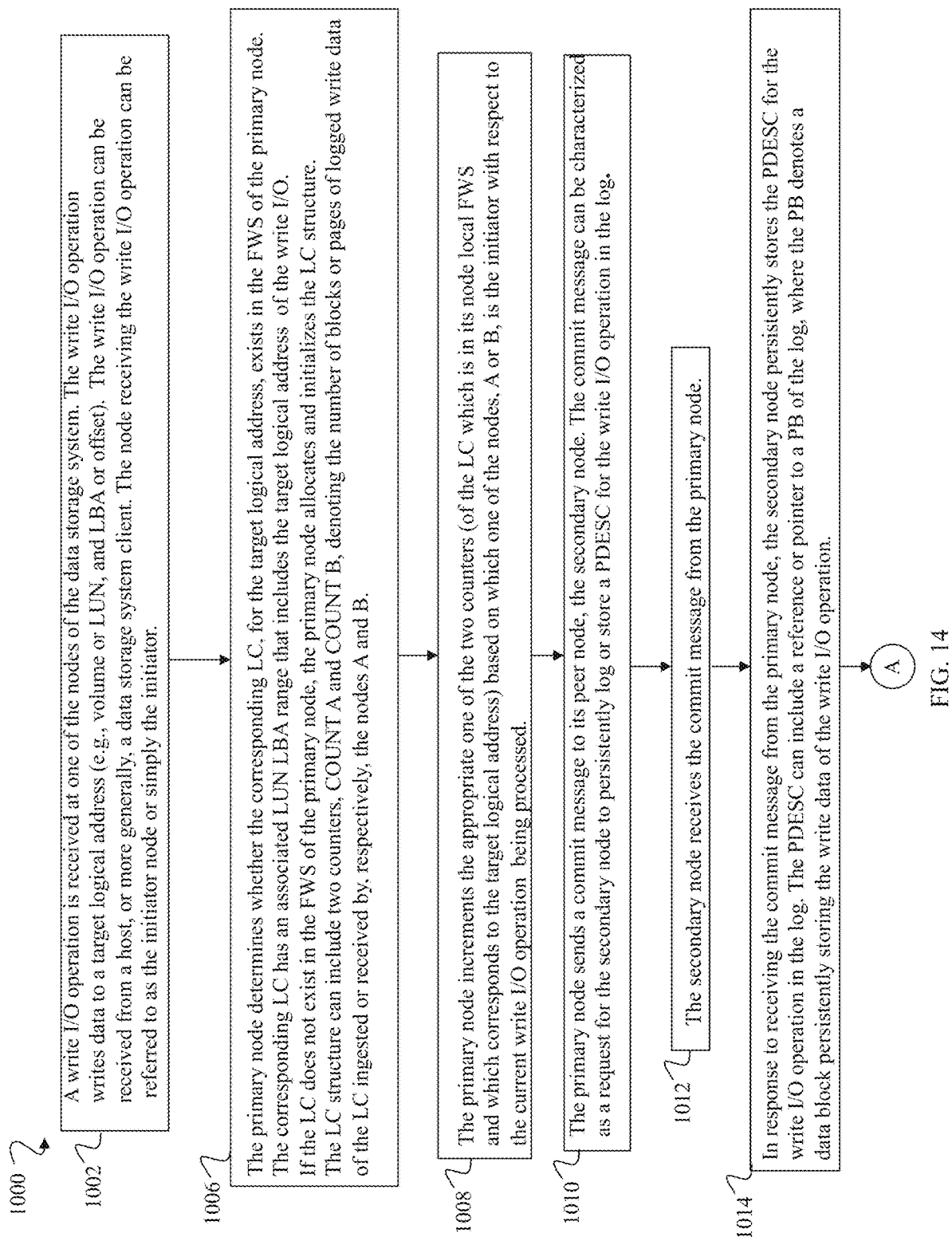

Referring to FIGS. 14 and 15, shown is a flowchart of processing steps of 1000 and 1050 that can be included in the data commit sequence when committing the write operation to the log. It should be noted that the steps of 1000 and 1050 can be characterized as a sequence in which the steps are performed from the perspective of a particular LC. An embodiment can perform additional steps besides those steps of 1000 and 1050. A more complete example of processing steps that can be included in the commit sequence when processing a write operation is described in more detail, for example, in connection with the example 400 of FIG. 16.

At the step 1002, a write I/O operation is received at one of the nodes of the data storage system. The write I/O operation writes data to a target logical address (e.g., volume or LUN, and LBA or offset). The write I/O operation can be received from a host, or more generally, a data storage system client. The node receiving the write I/O operation can be referred to as the initiator node or simply the initiator. From the step 1002, control proceeds to the step 1006.

At the step 1006, the primary node determines whether the corresponding LC, for the target logical address, exists in the FWS of the primary node. The corresponding LC has an associated LUN LBA range that includes the target logical address of the write I/O. If the LC does not exist in the FWS of the primary node, the primary node allocates and initializes the LC structure. The LC structure can include two counters, COUNT A and COUNT B, denoting the number of blocks or pages of logged write data of the LC ingested or received by, respectively, the nodes A and B. From the step 1006, control proceeds to the step 1008

At the step 1008, the primary node increments the appropriate one of the two counters (of the LC which is in its node local FWS and which corresponds to the target logical address) based on which one of the nodes, A or B, is the initiator with respect to the current write I/O operation being processed. From the step 1008, control proceeds to the step 1010.

At the step 1010, the primary node sends a commit message to its peer node, the secondary node. The commit message can be characterized as a request for the secondary node to persistently log or store a PDESC for the write I/O operation in the log. From the step 1010, control proceeds to the step 1012.

At the step 1012, the secondary node receives the commit message from the primary node. From the step 1012, control proceeds to the step 1014.

At the step 1014, in response to receiving the commit message from the primary node, the secondary node persistently stores the PDESC for the write I/O operation in the log. The PDESC can include a reference or pointer to a PB of the log, where the PB denotes a data block persistently storing the write data of the write I/O operation. From the step 1014, control proceeds to the step 1016.

At the step 1016, the secondary node determines whether the corresponding LC, for the target logical address, exists in the FWS of the secondary node. The corresponding LC has an associated LUN LBA range that includes the target logical address of the write I/O. If the LC does not exist in the FWS of the secondary node, the secondary node allocates and initializes the LC structure. The LC structure can include two counters, COUNT A and COUNT B, denoting the number of blocks or pages of logged write data of the LC ingested or received by, respectively, the nodes A and B. From the step 1016, control proceeds to the step 1018.

At the step 1018, the secondary node increments the appropriate one of the two counters (of the LC which is in its node local FWS and which corresponds to the target logical address) based on which one of the nodes, A or B, is the initiator with respect to the current write I/O operation being processed. From the step 1018, control proceeds to the step 1020.

At the step 1020, the secondary node adds an entry to the LC (which is in its node local FWS and which corresponds to the target logical address) for the PDESC representing the write I/O operation. The entry is added to the list of logged writes of the LC. The LC can include a linked list which represents a time-ordered list of logged write I/O operations. Each of the logged write I/O operations on the list can be represented by a corresponding PDESC. The list of the LC can be a linked list of pointers to the secondary node's memory local copy of PDESCs describing the write I/O operations to logical addresses included in the LUN LBA range associated with the LC. From the step 1020, control proceeds to the step 1022.

At the step 1022, the secondary node sends a reply, acknowledgement or response to the primary node for the previously received commit message. The reply can denote that the secondary node has completed its portion of the data commit processing to persistently commit the write I/O to the log. From the step 1022, control proceeds to the step 1024.

At the step 1024, the primary node receives the reply from the secondary node and, in response, performs additional processing including adding an entry for the PDESC for the write I/O operation (where the PDESC is persistently stored in the log 406) to the list of logged writes of the LC (which is in the primary node's local FWS and which corresponds to the target logical address). The LC can include a linked list which represents a time-ordered list of logged write I/O operations. Each of the logged write I/O operations on the list can be represented by a corresponding PDESC. The list of the LC can be a linked list of pointers to the primary node's memory local copy of PDESCs describing the write I/O operations to logical addresses included in the LUN LBA range associated with the LC. From the step 1024, control proceeds to the step 1026.

At the step 1026, after the PDESC and PB for the write I/O have been persistently stored in the log, the initiator node returns a reply or acknowledgement for the write I/O operation to the client which sent the write I/O operation.

As discussed above with the protocol (e.g., the processing of 1000 and 1050) used to process received operations or requests, such as write operations received by the nodes, each of the nodes may include a local copy of the FWS where the local copies of the two nodes may be synchronized as each received write operation is processed using the protocol.

In at least one embodiment, the FWS of a node may be node-local and shared and used by flush worker threads or processes of the node. In at least one embodiment, both of the nodes in a dual node system may independently perform processing to flush the log when log flushing has been triggered. In connection with flushing the log, logged operations represented by persistently stored entries in the log are flushed from the log. In particular, the logged operations can include logged write operations represented by PDESC-PB pairs of the log which are flushed to the non-volatile BE PDs. Subsequent to flushing logged operations from the log, the log space or storage of the flushed operations may be reclaimed for reuse.

When flushing, each of the nodes may execute one or more code entities, such as flush worker threads or processes, that operate independently. In at least one embodiment, flush worker threads executing on a node may use the node's local FWS and detach LCs from the node's local FWS for flushing. Since the FWS is a structure that may be shared among multiple flush worker threads or processes on the same node, any suitable synchronization technique may be used to synchronize access to the FWS among such threads or processes executing the same node. As discussed in more detail below, flush worker threads of a node, such as node A, may detach LCs of the FWS stored locally on the node A. The LCs detached for flushing by the flush worker threads of a node may be based on the concept of ownership assigned to the individual LCs. Consistent with other discussion herein, the LCs detached for flushing by the flush worker threads of the node A may only be those LCs having the node A designated as the LC flush owner (sometimes also referred to simply as owner). The LCs may be viewed as detachable units or containers of PDESCs of the log to be flushed. Thus, a thread or process of a node, such as the node A, performing flushing may detach LCs owned by the node A from the FWS of the node A until a sufficient number of LCs have been detached to fill a buffer of a particular size to be destaged from the log to the BE PDs. The buffer may include the PBs of the user data or content stored by the logged write operations. The mapping information or MD (e.g., FIG. 8) used to map logical address to physical storage locations may also be accordingly updated as the logged writes are flushed from the log to the BE PDs. Additionally, as the LCs of the PDESCs or the logged writes are flushed from the log, the FWS and the log may be accordingly updated. Log space (e.g., the PDESCs and PBs of the log) associated with the flushed records may be reclaimed for reuse.

In at least one embodiment, each logged write operation may be represented by a PDESC-PB pair of the log. Each LC may be associated with an LBA range of one of the LUNs storing user data. Storing the PDESC-PB pair in the log as part of the protocol described in more detail below may include storing the PDESC of the pair in a particular LC of the FWS structure on each of the nodes, where the PDESC-PB pair logs a write to a target logical address expressed using a target LUN and target LBA, and where the particular LC is associated with an LBA range including the target LBA for the target LUN. The particular LC in the FWS may be determined in any suitable manner. In at least one embodiment, the LBA range of a single LC may also be associated with a MD leaf In this manner, the PDESCs of the same LC may denote writes to the same LBA range associated with the same MD leaf. For example, in at least one embodiment, an LC associated with a particular MD leaf may be determined using a deterministic mathematical function that maps each PDESC-PB pair to an LC, where the PDESC-PB pair may write to a target LBA or offset of a target logical address and the LC has an associated LBA range including the target LBA.

In at least one embodiment in accordance with the techniques herein, ownership of each LC may be determined based on counters of the LC as discussed in more detail elsewhere herein.

Figure 16:
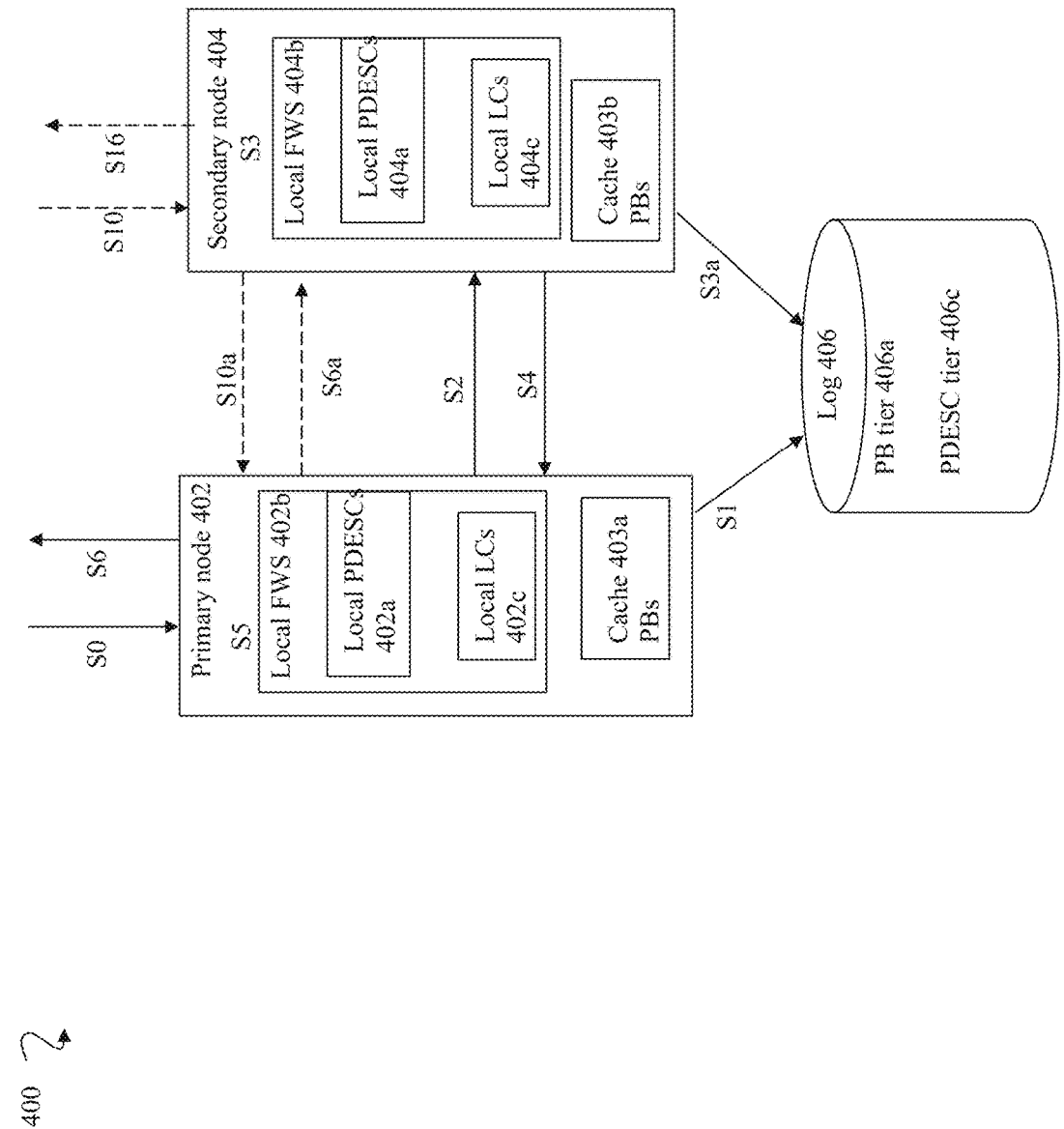

Referring to FIG. 16, shown is an example 400 illustrating a sequence of steps of a commit protocol that may be used in a system in at least one embodiment in accordance with the techniques herein to process received requests, such as write I/O operations. The example 400 illustrates the dual node architecture including a primary node 402, a secondary node 404, and the log 406. Consistent with other discussion herein, a first of the two nodes, A and B can be designated the role of primary node 402 and the second remaining peer node can be designated the role of secondary node 404. The node which receives the write operation, such as from a host or other external client, can be designated as the initiator with respect to the write operation.

Generally, the sequence of steps of the commit protocol illustrated in the example 400 can be performed to commit the received write operation to the log 406. The example 400 provides further detail regarding additional processing that can be performed in at least one embodiment in connection with the processing described in connection with FIGS. 14 and 15. Consistent with the at least one embodiment as described in connection with FIGS. 14 and 15, the example 400 illustrates processing that persistently stores a PDESC-PB pair (representing the write operation) in the log 406. Additionally, a first primary node local memory-resident copy of the PDESC representing the write operation is added to a corresponding LC on the primary node first, and then a second secondary node local memory-resident copy of the PDESC representing the write operation is added to a corresponding LC on the secondary node. In this manner, if the corresponding LC does not exist, it can be allocated and added to the FWS of the primary node prior to subsequently allocating and adding the corresponding LC to the FWS of the secondary node. One rationale for performing the foregoing sequence in at least one embodiment relates to simplified error handling, for example, in the case where there is a memory allocation failure. If processing is performed in such an embodiment where memory for LCs on the nodes is allocated in the same order, such as primary node first following by the secondary node), it may be assumed that if the primary node is able to successfully allocate memory for the LC, the memory allocation of the LC on the secondary node should also succeed since, in at least one embodiment, both the primary and secondary nodes can each have the same amount of volatile memory configured for use with the node's local FWS. In this manner, the error handling of a memory allocation failure can be simplified.

The example 400 illustrates the sequence of steps that can be performed in at least one embodiment to process a received write I/O operation.

Consistent with other discussion herein, both the nodes 402 and 404 have local synchronized copies of the FWSs in their local volatile memory. The elements 402b and 404b denote the volatile memory copies of the FWSs stored respectively on the primary node 402 and the secondary node 404. The elements 402a and 404a denote the volatile memory copies of the PDESCs of FWSs stored respectively on the primary node 402 and the secondary node 404. The elements 402c and 404c denote the volatile memory copies of the LCs of the FWSs stored respectively on the primary node 402 and the secondary node 404.

As also noted elsewhere herein, both of the nodes 402 and 404 may have a copy of at least some portion of the PBs of the log 406 stored in a portion of each node's local volatile memory used as the node's local cache. For example, the element 403a may denote the local volatile memory cache used by the primary node 402, where the cache 403a may include at least some of the PBs for write operations received by the primary node 402. The element 403b may denote the local volatile memory cache used by the secondary node 404, where the cache 403b may include at least some of the PBs for write operations received by the secondary node 404. Generally, the cache 403a of the primary node may be a designated portion of the primary node's volatile memory, such as RAM, used as the primary node's local data cache for storing data such as some portion of the PBs for writes received by the primary node. The PBs and other data stored in the primary node's local data cache 403a may be subject to eviction in accordance with the particular caching policy implemented. In contrast, the FWS 402b stored in the primary node's local volatile memory may be memory resident. In a similar manner, the cache 403b of the secondary node may be a designated portion of the secondary node's volatile memory, such as RAM, used as the secondary node's local data cache for storing data such as some portion of the PBs for writes received by the secondary node. The PBs and other data stored in the secondary node's local data cache 403b may be subject to eviction in accordance with the particular caching policy implemented. In contrast, the FWS 404b stored in the secondary node's local volatile memory may be memory resident.

Referring to the example 400, at a step S0, the primary node 402 can receive the write I/O from a host whereby the primary node 402 is the initiator node with respect to the received write I/O operation.

Alternatively, in an active-active configuration where writes can be received by both the nodes 402 and 404, the write I/O operation can be received by the secondary node 404 as denoted by the step S10, whereby the secondary node 404 may then trigger or request S10a that the primary node 402 commence processing for committing or logging the write I/O operation.

Following the step S0 or the step S10a, a step S1 can performed in which the primary node 402 allocates a PB for the write I/O in the log 406, and persistently stores the write data of the received write I/O in the PB of the log 406. If the primary node is the initiator node that received the write operation (e.g., step S0 is performed rather than the steps S10 and S10a), the step S1 may also include storing the received write I/O data or payload in the primary node's local data cache 403a. The log 406 includes a PB tier 406a and a PDESC tier 406c. In the step S1, the primary node 402 allocates the PB for the write I/O from the PB tier 406a. The PDESC tier 406c denotes the PDESCs managed by the primary node, which in this example is node A.

Also in the step S1, the primary node 402 performs additional processing. The write I/O received in the step S0 (or alternatively step S10) writes first data to a target logical address, such as a LUN and a target LBA or offset on the LUN. In the step S1, the primary node 402 performs processing to map the write I/O to a particular LBA range of an LC corresponding to the write I/O, determining whether an instance of the particular LC exists in the FWS 402b. If the particular instance of the LC does not already exist in the FWS 402b, then the instance of the LC is created and included in the local LCs 402c of the FWS 402b. The additional processing of the step S1 may include determining whether the LCs 402c (of the local FWS 402b of the primary node) includes an instance of an LC with an associated LBA range that includes the target LUN LBA of the received write I/O. Put another way, does the LC (having the LBA range including the target LUN LBA of the write) already exist in the FWS 402b? If such an LC instance does not already exist in the FWS 402b of the primary node 402, then the LC instance is created in the local LCs 402c of the FWS 402b. The newly allocated LC instance of the FWS 402b can also be initialized in the step S1. If the LC instance mapped to the received write I/O already exists in the local FWS 402b, there is no need to allocate and initialize the LC instance of the local FWS 402b in the step S1. The step S1 can also include incrementing an appropriate one of the LC counters, either COUNT A or COUNT B, where COUNT A is incremented if the write I/O initiator node is node A and where COUNT B is increment if the write I/O initiator node is node B. Following the step S1 is a step S2.

In the step S2, the primary node allocates a PDESC from the PDESC tier 406*c* of the log 406, assigns a new sequence ID to the PDESC, and creates a local in-memory copy (402*a*) of the descriptor information to be stored in the PDESC. The descriptor information includes the new sequence ID, the target logical address and a pointer or reference to the allocated PB (of the PB tier 406*a*) including the persistently stored first data written by the received write I/O. The local in-memory copy 402*a* of the PDESC may be a node-local copy of the PDESCs in the primary node's local memory (e.g., RAM or other form of volatile memory) accessible only to the primary node 402. If the primary node is also the initiator node, the step S2 can also include updating the primary node's local in-memory copy 402*a* of the PDESC to reference or point to the cached copy of the PB stored in the primary node's cache 403*a*.

In the step S2, the primary node 402 sends the descriptor information and the address of the PDESC in PDESC tier 406*c* of the log 406 to the peer node, the secondary node 404. The message sent in the step S2 to from the node 402 to the node 404 may also be characterized as a commit message requesting the secondary node 404 to perform processing as a peer node to commit or service the request or operation described by the PDESC of the message. Following the step S2 is a step S3.

In the step S3, the secondary node 404 receives the message that is sent from the primary node in the step S2. The step S3 performed by the secondary node 404 can also include processing performed responsive to receiving the message sent from the primary node in the step S2. The message received by the secondary node in the step S3 from the primary node includes the descriptor information and the address of the allocated PDESC in the log 406. In the step S3, the secondary node persistently stores (S3*a*) the descriptor information of the write I/O in the PDESC located at the address in the log 406. In the step S3, the secondary node 404 also stores a copy of the PDESC of the write I/O in its node-local copy of the PDESCs 404*a* in its local memory (e.g., RAM or other form of volatile memory) accessible only to the node 404. Additionally, if the secondary node 404 is the initiator of the write, the secondary node 404 can store a copy of the write I/O data payload (as persistently stored in a PB of the log 406) in its node local cache 403*b*. If the secondary node is also the initiator node, the step S3 can also include updating the secondary node's local in-memory copy 404*a* of the PDESC to reference or point to the cached copy of the PB stored in the secondary node's cache 403*b*.

The step S3 can also include the secondary node 404 determining the LC with a corresponding LUN LBA range that includes the target logical address of the PDESC of the write I/O (e.g., the LBA of the target logical address of the PDESC of the write falls within the LUN LBA range of the LC). Put another way, the node 404 maps the LUN LBA of the PDESC of the write I/O to a particular LBA range of an LC that will include the log record (e.g., PDESC) for the write I/O, and then determines whether an instance of the LC exists in the FWS 404*b* of the secondary node 404.

If the instance of the LC does not already exist in the FWS 404*b*, then the node 404 can perform processing in the step S3 to allocate and initialize the instance of the LC, and then include the LC in the FWS 404*b*.

The step S3 can include the node 404 adding the node local in-memory copy of the PDESC of the write I/O (as included in the local PDESCs 404*a*) as an entry in the newly allocated LC of the FWS 404, and then incrementing an appropriate one of the LC counters, either COUNT A or COUNT B, depending on which of the nodes A or B is the initiator with respect to the write I/O being processed.

Following the step S3 is a step S4. In the step S4, the secondary node 404 returns a response or acknowledgement to the primary node 402 indicating that the PDESC for the write I/O is stored persistently in the log 406. The primary node 402 receives the response from the secondary node 404. Following the step S4 is a step S5.

In the step S5, the primary node 402 can add an entry, for the primary node's local copy of the PDESC for the write I/O received, to the instance of the LC included in the FWS 402*b*. Following the step S5, the initiator node sends a response to the host regarding successful completion of the write I/O operation received. In a case where the write I/O was received (S0) by the primary node 402 and thus where the primary node 402 is the initiator node, the primary node 402 can send a response (S6) to the host regarding successful completion of the write I/O operation received in the step S0. In an alternative case where the write I/O was received (S10) by the secondary node 404 and thus where the secondary node 404 is the initiator node, the primary node 402 can transfer control or return (S6*a*) to the secondary node 404. The secondary node 404 can then send a response (S16) to the host regarding successful completion of the write I/O operation received in the step S10.

In the foregoing protocol processing of 400, storage of the log 406 for the PDESC of a received write may be allocated by the primary node and the descriptor information of the PDESC of the received write may be persistently stored to the log 406 by the peer secondary node.

It should be noted that the processing of the example 400 is performed with respect to a write operation where a PDESC-PB pair for the write operation is logged persistently in the log 406. In some embodiments, other operations or requests may be similarly processed and logged. In at least one embodiment, some of the other operations or requests may only result in logging a PDESC without an associated PB. For example, an operation, command or request to create a snapshot may be logged using a PDESC assigned a sequence ID but where the PDESC is not associated with an allocated PB of the log.

In at least one embodiment, the PB tier 406*a* may be implemented as a pool and the PDESC tier 406*c* can be implemented as a ring buffer. In at least one embodiment the PB pool, such as the PB tier 406*a*, may be an array or linked list of PB entries. In one embodiment, a list of PBs may be denoted as a list of indices associated with the PBs. A bit vector may include a different bit for each PB, where the bit associated with a PB has a value of 1 when the PB is allocated and the bit associated with the PB otherwise has a value of 0 when the PB is unallocated or free. Once a PB is flushed, it may be reclaimed or released immediately by indicating that its associated index or bit in the bit vector denotes the state of unallocated or free (e.g., where the bit is set to 0). With a PB pool, each PB may be released or reclaimed immediately after the data of the PB has been flushed or destaged to a BE PD.

The proposed protocol and processing described herein guarantees race-free LC ownership assignment. Each LC, or more generally container, may be flushed by the owner node without requiring synchronization with the peer node during flushing. Both nodes have a consistent view of ownership of the various LCs of a frozen FWS and each node can independently perform processing to determine LC ownership and flush only those LCs for which the node is the owner. Additionally, an LC owner can be determined using the two counter, COUNT A and COUNT B, associated with the LC. In at least one embodiment, responsive to an initiator node receiving a write I/O, the initiator node can also cache the write I/O data payload in the initiator node's local volatile memory cache. However, in such an embodiment, the peer node or non-initiator node which did not receive the write I/O may not cache the write I/O data payload in its local volatile memory cache. In such an embodiment, the COUNT A can denote the number of writes associated with the LC which are received by the node A, and thus the number of writes or PBs of the LC stored in the cache of node A. In such an embodiment, the COUNT B can denote the number of writes associated with the LC which are received by the node B, and thus the number of writes or PBs of the LC stored in the cache of node B. The particular one of the nodes A or B with the higher associated COUNT A or COUNT B can be selected as the LC owner which flushes the logged writes associated with the LC. In this manner, the number of expected cache misses for PBs flushed from the log can be minimized.

Consistent with discussion herein, flushing of the log may be triggered by any one or more defined trigger events. For example, flushing may be triggered in response to the amount of free log space falling below a specified threshold minimum level. In at least one embodiment, flushing may be performed independently by both nodes of the system using the synchronized node local FWS structures 402b of the node A and 404b of the node B. Each node of the system may execute one or more flush worker threads or processes that may run in parallel on the two nodes. In at least one embodiment, each node may execute multiple flush worker threads or processes, where a first set of the multiple flush worker threads may run in parallel on the node A and a second set of the multiple flush worker threads may run in parallel on the node B. The flush worker threads executing on the node A may use node A's local FWS 402b that includes LCs referencing the node A's local copies of the PDESCs 402a. Each flush worker thread of node A may select a number of LCs from the local FWS 402b, where the selected LCs all have an ownership of node A. In this manner, flush worker threads of the node A only access for flushing LCs having ownership of the node A. The flush worker threads executing on the node B may use node B's local FWS 404b that includes LCs referencing the node B's local copies of the PDESCs 404a. Each flush worker thread of node B may select a number of LCs from the local FWS 404b, where the selected LCs all have an ownership of the node B. In this manner, flush worker threads of the node B only access for flushing LCs having ownership of the node B. Flushing an LC including a PDESC of a logged write operation may include using the PDESC of to access the PB containing the user data, storing the user data at a physical storage location on a BE PD, and updating the metadata or mapping information for the logical address of the PDESC to now indicate that the user data stored at the logical address is stored at the physical storage location.

As LCs of logged operations are detached and flushed from the log, the PDESC-PB pair of each flushed log record may be reclaimed for reuse. It should be noted that the log space reclamation process may vary with embodiment in accordance with the particular structures and policies used in implementing and maintaining the PDESCs and the PBs of the log.

Referring to FIG. 17, shown is a flowchart 1100 of processing that can be performed on each of the nodes to determine LC ownership and thus select LCs of an FWS for flushing by the node in at least one embodiment in accordance with the techniques of the present disclosure.

At the step 1102, each of the nodes A and B can maintain its own node local pointer which points to, or references, the next LC in the node's local FWS to be considered as a candidate for flushing by the node. For example, cursor A can denote the next LC in node A's local FWS considered as a candidate for flushing by the node A; and cursor B can denote the next LC in node B's local FWS considered as a candidate for flushing by the node B. From the step 1102, control proceeds to the step 1104.

At the step 1104, the node determines which of the two nodes, A or B, is the owner (flush owner) of the next LC referenced by the cursor. The owner of an LC denotes the node which handles flushing the list of PDESCs of the LC, where the PDESCs represent persistently logged write operations that write data to target logical addresses that are included in the LUN LBA range associated with the LC.

In the step 1104, determining the flush owner of the next LC uses the two counters, COUNT A and COUNT B, of the LC as follows:

If COUNT A>COUNT B, then the flush owner is the node A.

If COUNT A<COUNT B, then the flush owner is the node B.

If COUNT A=COUNT B, use as alternate technique for deciding the flush owner of the next LC referenced by the cursor.

In at least one embodiment, the alternate technique can include obtaining a hash value HV by applying a hash function to the starting LBA of the LUN LBA range associated with the next LC. One or more specific bit values of the HV can be examined and used to determine the flush owner. For example, the value of the MSB (most significant bit) of the HV can examined, where if the MSB=0, then a predetermined one of the two nodes A and B, such as node A, can be selected as the flush owner; and otherwise where the MSB=1, the remaining one of the two nodes, such as node B, can be selected as the flush owner. From the step 1104, control proceeds to the step 1106.

At the step 1106, if the node performing the processing is determined as the flush owner of the next LC in the node's local FWS, then the node can perform processing to flush the LC referenced by the cursor. Otherwise, if the node determines that the flush owner is alternatively the peer node, then the node does not flush the LC referenced by the cursor and advances the cursor to the next subsequent LC in the node's local FWS for evaluation as a candidate for flushing by the node. Generally, a node only flushes LCs for which the node determines that it is the flush owner. From the step 1106, control proceeds to the step 1108.

At the step 1108, a determination is made as to whether the node should continue flushing. If the step 1108 evaluates to yes control proceeds to the step 1104, otherwise, the node stops flush processing.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
receiving a plurality of write operations at a data storage system including a plurality of nodes comprising a first node and a second node, wherein the plurality of write operations write to a plurality of target logical addresses included in a first logical block address (LBA) range;
maintaining a first counter and a second counter of a first container associated with the first LBA range, wherein the first container is associated with a first list of recorded write operations of a log having target logical addresses in the first LBA range, wherein the first list includes a first plurality of page descriptors (PDESCs) corresponding to entries of the log for the plurality of write operations, wherein the first counter indicates how many of the plurality of write operations are received at the first node and the second counter indicates how many of the plurality of write operations are received at the second node, wherein, for each of the plurality of write operations received by the first node, the first node stores write data written by said each write operation in a first cache local to the first node, and for each of the plurality of write operations received by the second node, the second node stores write data written by said each write operation in a second cache local to the second node;
performing first processing to determine a flush owner of the first container, said first processing including:
comparing the first counter and the second counter;
responsive to said comparing determining the first counter is greater than the second counter, assigning the first node as the flush owner of the first container;
responsive to said comparing determining the second counter is greater than the first container, assigning the second node as the flush owner of the first container; and
responsive to said comparing determining that the first counter is equal to the second counter, performing second processing to determine which of the first node and the second node is the flush owner of the first container; and
the flush owner of the first container flushing the first list of recorded write operations of the log associated with the first container.

2. The computer-implemented method of claim 1, wherein the first LBA range associated with the first container is from a starting LBA to an ending LBA, and wherein said second processing includes:
determining, using a hash function, a hash value for the starting LBA of the first container;
determining a most significant bit of the hash value; and
responsive to the most significant bit of the hash value being zero, assigning one node of the first node and the second node as the flush owner of the first container, and otherwise assigning a remaining one of the first node and the second node as the flush owner of the first container.

3. The computer-implemented method of claim 1, wherein each PDESC of the first plurality of PDESCs of the first list references a page block (PB) storing write data written by one of the plurality of write operations represented by said each PDESC.

4. The computer-implemented method of claim 1, wherein the first node includes a first flush working set (FWS) comprising a first plurality of containers each associated with a corresponding list of recorded write operations of the log having target logical addresses in a corresponding LBA range associated with said each container, and wherein the second node includes a second FWS comprising a second plurality of containers each associated with a corresponding list of recorded write operations of the log having target logical addresses in a corresponding LBA range associated with said each container.

5. The computer-implemented method of claim 4, wherein the first FWS of the first node includes the first container, wherein the second FWS of the second node includes a second container associated with the first LBA range, wherein the second container is associated with a second list of recorded write operations of the log having target logical addresses in the first LBA range, wherein the second list includes a second plurality of page descriptors (PDESCs) corresponding to entries of the log for the plurality of write operations, wherein the second container includes a third counter and a fourth counter, and wherein the third counter indicates how many of the plurality of write operations are received at the first node and the fourth counter indicates how many of the plurality of write operations are received at the second node.

6. The computer-implemented method of claim 5, wherein, for each of the plurality of write operations received by the first node, the first list of the first container of the first FWS includes a corresponding PDESC for said each write operation where the corresponding PDESC references a cache location, in the first cache local to the first node, storing write data written by said each write operation.

7. The computer-implemented method of claim 6, wherein, for each of the plurality of write operations received by the second node, the second list of the second container of the second FWS includes a corresponding PDESC for said each write operation where the corresponding PDESC references a cache location, in the second cache local to the second node, storing write data written by said each write operation.

8. The computer-implemented method of claim 7, wherein a first write operation of the plurality of write operations is received by one of the first node and the second node, wherein said one node is referred to as an initiator node with respect to the first write operation, wherein one of the first node and the second node is designated as a primary node and a remaining one of the first node and the second node is designated as a secondary node, and wherein processing for the first write operation of the plurality of write operations includes:
the primary node determining whether the first FWS includes the first container thereby indicating that the first write operation is an initial write to the first container of the first FWS;
responsive to the primary node determining that the first FWS does not include the first container, the primary node allocating the first container;
the primary node incrementing an appropriate one of the first counter and the second counter of the first container in accordance with which one of the first node and the second node is the initiator node with respect to the first write operation; and the primary node sending a commit message to the secondary node.

9. The computer-implemented method of claim 8, wherein responsive to the secondary node receiving the commit message, the secondary node performs secondary node processing comprising:
 the secondary node persistently storing information in a PDESC of the log for the first write operation;
 the secondary node determining whether the second FWS includes the second container thereby indicating that the first write operation is an initial write to the second container of the second FWS;
 responsive to the secondary node determining that the second FWS does not include the second container, the secondary node allocating the second container;
 the secondary node adding a first PDESC for the first write operation as an entry to the second list of the second container;
 the secondary node incrementing an appropriate one of the third counter and the fourth counter of the second container in accordance with which one of the first node and the second node is the initiator node with respect to the first write operation; and
 the secondary node returning a response to the primary node acknowledging the commit message.

10. The computer-implemented method of claim 9, further comprising:
 responsive to the primary node receiving the response from the secondary node, the primary node adding a second PDESC for the first write operation as an entry to the first list of the first container.

11. The computer-implemented method of claim 10, wherein the first FWS is stored in a first volatile memory of the first node and accessed by a first plurality of flusher threads executing on the first node in connection with flushing any of the first plurality of containers for which the first node is flush owner, and wherein the second FWS is stored in a second volatile memory of the second node and accessed by a second plurality of flusher threads executing on the second node in connection with flushing any of the second plurality of containers for which the second node is flush owner.

12. The computer-implemented method of claim 11, wherein the first node determines flush ownership for the first plurality of containers using a corresponding pair of counters of each of the first plurality of containers, wherein each corresponding pair of counters for an associated one of the first plurality of containers includes one counter, indicating how many logged write operations associated with said associated one container are received by the first node, and includes another counter, indicating how many logged write operations associated with said one container are received by the second node.

13. The computer-implemented method of claim 12, wherein the second node determines flush ownership for the second plurality of containers using a corresponding pair of counters of each of the second plurality of containers, wherein each corresponding pair of counters for an associated one of the second plurality of containers includes one counter, indicating how many logged write operations associated with said associated one container are received by the first node, and includes another counter, indicating how many logged write operations associated with said one container are received by the second node.

14. The computer-implemented method of claim 13, wherein, for each of the first plurality of containers, the first node performs third processing to determine flush ownership, comprising:
 comparing said one counter and said another counter of the corresponding pair of counters of said each of first plurality of containers;
 responsive to determining that said one counter is greater than said another counter, assigning the first node as the flush owner of said each of the first plurality of containers;
 responsive to determining that said another counter is greater than said one counter, assigning the second node as the flush owner of said each of the first plurality of containers;
 responsive to determining that the one counter is equal to the another counter, performing other processing to determine which of the first node and the second node is the flush owner of said each of the first plurality of containers; and
 the first node flushing recorded write operations of the log associated with any of the first plurality of containers which the first node determines that the first node is the flush owner.

15. The computer-implemented method of claim 13, wherein, for each of the second plurality of containers, the second node performs third processing to determine flush ownership, comprising:
 comparing said one counter and said another counter of the corresponding pair of counters of said each of second plurality of containers;
 responsive to determining that said one counter is greater than said another counter, assigning the first node as the flush owner of said each of the second plurality of containers;
 responsive to determining that said another counter is greater than said one counter, assigning the second node as the flush owner of said each of the second plurality of containers;
 responsive to determining that the one counter is equal to the another counter, performing other processing to determine which of the first node and the second node is the flush owner of said each of the first plurality of containers; and
 the second node flushing recorded write operations of the log associated with any of the first plurality of containers which the second node determines that the second node is the flush owner.

16. The computer-implemented method of claim 13, wherein each of the first plurality of containers of the first FWS of the first node has a corresponding container included in the second plurality of containers of the second FWS of the second node, and wherein said each container of the first plurality and its corresponding container of the second plurality both are associated with a same set of recorded write operations of the log.

17. The computer-implemented method of claim 16, wherein a metadata (MD) structure of mapping information is used to map logical addresses, including the plurality of target logical addresses, to corresponding physical storage locations including content stored at the logical addresses.

18. The computer-implemented method of claim 17, wherein the MD structure is a hierarchical structure including a plurality of MD leaf pages each associated with a contiguous range of LBAs of a logical device, wherein the first LBA range is a first contiguous LBA range associated with a first MD leaf page of the plurality of MD leaf pages, and wherein each of the plurality of MD leaf pages having a corresponding LBA range is associated with a first corresponding container of the first plurality of containers of the first FWS including logged writes with target logical addresses in the corresponding LBA range, and is also associated with a second corresponding one of the second plurality of containers of the second FWS including logged writes with target logical addresses in the corresponding LBA range.

19. A system comprising:
one or more processors; and
a memory comprising code stored thereon that, when executed, performs a method comprising:
receiving a plurality of write operations at a data storage system including a plurality of nodes comprising a first node and a second node, wherein the plurality of write operations write to a plurality of target logical addresses included in a first logical block address (LBA) range;
maintaining a first counter and a second counter of a first container associated with the first LBA range, wherein the first container is associated with a first list of recorded write operations of a log having target logical addresses in the first LBA range, wherein the first list includes a first plurality of page descriptors (PDESCs) corresponding to entries of the log for the plurality of write operations, wherein the first counter indicates how many of the plurality of write operations are received at the first node and the second counter indicates how many of the plurality of write operations are received at the second node, wherein, for each of the plurality of write operations received by the first node, the first node stores write data written by said each write operation in a first cache local to the first node, and for each of the plurality of write operations received by the second node, the second node stores write data written by said each write operation in a second cache local to the second node;
performing first processing to determine a flush owner of the first container, said first processing including:
comparing the first counter and the second counter;
responsive to said comparing determining the first counter is greater than the second counter, assigning the first node as the flush owner of the first container;
responsive to said comparing determining the second counter is greater than the first container, assigning the second node as the flush owner of the first container; and
responsive to said comparing determining that the first counter is equal to the second counter, performing second processing to determine which of the first node and the second node is the flush owner of the first container; and
the flush owner of the first container flushing the first list of recorded write operations of the log associated with the first container.

20. A computer readable medium comprising code stored thereon that, when executed, performs a method of comprising:
receiving a plurality of write operations at a data storage system including a plurality of nodes comprising a first node and a second node, wherein the plurality of write operations write to a plurality of target logical addresses included in a first logical block address (LBA) range;
maintaining a first counter and a second counter of a first container associated with the first LBA range, wherein the first container is associated with a first list of recorded write operations of a log having target logical addresses in the first LBA range, wherein the first list includes a first plurality of page descriptors (PDESCs) corresponding to entries of the log for the plurality of write operations, wherein the first counter indicates how many of the plurality of write operations are received at the first node and the second counter indicates how many of the plurality of write operations are received at the second node, wherein, for each of the plurality of write operations received by the first node, the first node stores write data written by said each write operation in a first cache local to the first node, and for each of the plurality of write operations received by the second node, the second node stores write data written by said each write operation in a second cache local to the second node;
performing first processing to determine a flush owner of the first container, said first processing including:
comparing the first counter and the second counter;
responsive to said comparing determining the first counter is greater than the second counter, assigning the first node as the flush owner of the first container;
responsive to said comparing determining the second counter is greater than the first container, assigning the second node as the flush owner of the first container; and
responsive to said comparing determining that the first counter is equal to the second counter, performing second processing to determine which of the first node and the second node is the flush owner of the first container; and
the flush owner of the first container flushing the first list of recorded write operations of the log associated with the first container.

* * * * *